United States Patent
Douillard et al.

(10) Patent No.: US 11,714,423 B2
(45) Date of Patent: Aug. 1, 2023

(54) VOXEL BASED GROUND PLANE ESTIMATION AND OBJECT SEGMENTATION

(71) Applicant: Zoox, Inc., Foster City, CA (US)

(72) Inventors: Bertrand Robert Douillard, Palo Alto, CA (US); Subhasis Das, Menlo Park, CA (US); Zeng Wang, Menlo Park, CA (US); Dragomir Dimitrov Anguelov, San Francisco, CA (US); Jesse Sol Levinson, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 230 days.

(21) Appl. No.: 16/584,392

(22) Filed: Sep. 26, 2019

(65) Prior Publication Data

US 2020/0026292 A1    Jan. 23, 2020

Related U.S. Application Data

(63) Continuation of application No. 15/622,905, filed on Jun. 14, 2017, now Pat. No. 10,444,759.

(51) Int. Cl.
*G05D 1/02* (2020.01)
*G01S 17/58* (2006.01)
(Continued)

(52) U.S. Cl.
CPC ............. *G05D 1/024* (2013.01); *G01S 17/58* (2013.01); *G01S 17/66* (2013.01); *G01S 17/86* (2020.01);
(Continued)

(58) Field of Classification Search
CPC ...... G05D 1/024; G05D 1/0212; G01S 17/86; G01S 17/931; G01S 17/58; G01S 17/66;
(Continued)

(56) References Cited

U.S. PATENT DOCUMENTS 8,379,020 B2    2/2013  Clifton
8,913,784 B2   12/2014  Collard et al.
(Continued)

FOREIGN PATENT DOCUMENTS

CN      105787445 A     7/2016
EP        3078935 A1   10/2016
(Continued)

OTHER PUBLICATIONS

Asvadi et al., "Two-Stage Static Dynamic Environment Modeling using Voxel Representation", Robot 2015, Second Iberian Robotics Conf, Nov. 2015, 12 pgs.
(Continued)

*Primary Examiner* — Nga X Nguyen
(74) *Attorney, Agent, or Firm* — Lee & Hayes, P.C.

(57) ABSTRACT

Systems, methods, and apparatuses described herein are directed to performing segmentation on voxels representing three-dimensional data to identify static and dynamic objects. LIDAR data may be captured by a perception system for an autonomous vehicle and represented in a voxel space. Operations may include determining a drivable surface by parsing individual voxels to determine an orientation of a surface normal of a planar approximation of the voxelized data relative to a reference direction. Clustering techniques can be used to grow a ground plane including a plurality of locally flat voxels. Ground plane data can be set aside from the voxel space, and the remaining voxels can be clustered to determine objects. Voxel data can be analyzed over time to determine dynamic objects. Segmentation information associated with ground voxels, static object, and dynamic objects can be provided to a tracker and/or planner in conjunction with operating the autonomous vehicle.

17 Claims, 11 Drawing Sheets

(51) Int. Cl.

| | |
|---|---|
| *G06T 7/187* | (2017.01) |
| *G01S 17/66* | (2006.01) |
| *G01S 17/02* | (2020.01) |
| *G06T 7/11* | (2017.01) |
| *G01S 17/89* | (2020.01) |
| *G01S 17/93* | (2020.01) |
| *G06K 9/00* | (2022.01) |
| *G01S 17/86* | (2020.01) |
| *G01S 17/931* | (2020.01) |
| *G06V 20/56* | (2022.01) |
| *G01S 13/86* | (2006.01) |
| *G01S 15/931* | (2020.01) |
| *G01S 13/931* | (2020.01) |
| *G01S 13/72* | (2006.01) |
| *G01S 15/86* | (2020.01) |

(52) U.S. Cl.
CPC .......... *G01S 17/931* (2020.01); *G05D 1/0212* (2013.01); *G06T 7/11* (2017.01); *G06T 7/187* (2017.01); *G06V 20/56* (2022.01); *G01S 13/726* (2013.01); *G01S 13/862* (2013.01); *G01S 13/865* (2013.01); *G01S 13/867* (2013.01); *G01S 13/931* (2013.01); *G01S 15/86* (2020.01); *G01S 15/931* (2013.01); *G06T 2207/10028* (2013.01); *G06T 2207/30252* (2013.01)

(58) Field of Classification Search
CPC ...... G01S 15/86; G01S 13/865; G01S 15/931; G01S 13/867; G01S 13/931; G01S 13/862; G01S 13/726; G06T 7/187; G06T 7/11; G06T 2207/10028; G06T 2207/30252; G06T 17/05; G06K 9/00791
See application file for complete search history.

(56) References Cited

U.S. PATENT DOCUMENTS

| | | | |
|---|---|---|---|
| 9,110,163 | B2 | 8/2015 | Rogan |
| 9,523,772 | B2 | 12/2016 | Rogan et al. |
| 9,633,483 | B1* | 4/2017 | Xu ................. G06K 9/6267 |
| 2014/0368493 | A1* | 12/2014 | Rogan ................. G06V 40/20 345/419 |
| 2014/0368807 | A1* | 12/2014 | Rogan ................. G01S 17/89 356/28 |
| 2016/0154999 | A1 | 6/2016 | Fan et al. |
| 2016/0275790 | A1* | 9/2016 | Kang ............ G08G 1/096716 |
| 2017/0220876 | A1 | 8/2017 | Gao et al. |
| 2017/0248963 | A1 | 8/2017 | Levinson et al. |
| 2018/0012370 | A1 | 1/2018 | Aghamohammadi et al. |
| 2018/0074203 | A1* | 3/2018 | Zermas ............... G06N 20/00 |
| 2018/0136332 | A1 | 5/2018 | Barfield, Jr. et al. |
| 2018/0364717 | A1 | 12/2018 | Douillard et al. |
| 2019/0114481 | A1 | 4/2019 | DeChant et al. |
| 2019/0156485 | A1 | 5/2019 | Pfeiffer |

FOREIGN PATENT DOCUMENTS

| | | |
|---|---|---|
| JP | 2017045148 A | 3/2017 |
| KR | 20180099280 A  * | 2/2017 |

OTHER PUBLICATIONS

Azim, et al., "Detection, Classification and Tracking of Moving Objects in a 3D Environment", Jun. 2012 Intelligent Vehicles Symposium, 3 pages.
Byun, et al., "Toward Accurate Road Detection in Challenging Environments Using 30 Point Clouds", ETRI Journal, vol. 37, No. 3, Jun. 2015, 6 pages.
The PCT Invitation to Pay Additional Fees, mailed on Feb. 15, 2019, for PCT Application No. PCT/US18/59304, 12 pages.
Lehtomaki, et al., "Object Classification and Recognition From Mobile Laser Scanning Point Clouds in a Road Environment", IEEE Transactions On Geoscience and Remote Sensing, vol. 54, No. 2, Feb. 2016, 7 pages.
Morton et al., "An Evaluation of Dynamic Object Tracking with 3D LIDAR", Proceedings Australasian Conf on Robotics and Automation, Dec. 2011, 20 pgs.
Na, et al., "The Ground Segmentation of 30 LIDAR Point Cloud with the Optimized Region Merging", 2013 International Conference on Connected Vehicles and Expo (ICCVE), IEEE, Dec. 2, 2013, 3 pgs.
Office Action for U.S. Appl. No. 15/622,905, dated Mar. 7, 2019, Douillard et al., "Voxel Based Ground Plane Estimation and Object Segmentation", 7 pages.
Office Action for U.S. Appl. No. 15/820,245, dated May 16, 2019, Pfeiffer, "Sensor Data Segmentation", 7 pages.
The PCT Search Report and Written Opinion dated Apr. 11, 2019, for PCT Application No. PCT/US2018/059304, 18 pages.
The PCT Search Report and Written Opinion dated Apr. 2, 2019 for PCT Application No. PCT/US2019/016968, 14 pages.
The PCT Search Report and Written Opinion dated Aug. 31, 2018, for PCT Application No. PCT/US18/36410, 14 pages.
Piewak, et al., "Boosting LiDAR-Based Semantic Labeling by Cross-modal Training Data Generation", Published Apr. 26, 2018, by Springer, International Publishing, in Serious Games, part VI, Sections 3.3 and 3 4, 16 pages.
Varga, et al., "Super-sensor for 360-degree environment perception: Point cloud segmentation using image features", 2017 IEEE 20th International Conference on Intelligent Transportation Systems (ITSC), IEEE, Oct. 16, 2017, sections III.A, III.B, IV.C, IV.D, pp. 1-8.
Xiao, et al., "CRF based Road Detection with Multi-Sensor Fusion", 2015 IEEE Intelligent Vehicles Symposium (IV), IEEE, Jun. 28, 2015 (Jun. 28, 2015), pp. 192-198.
European Office Action dated Dec. 1, 2021 for European Patent Application No. 18734721.6, a foreign counterpart to U.S. Pat. No. 10,444,759, 5 pages.
Japanese Office Action dated Jun. 28, 2022 for Japanese Patent Application 2019-567592 a counterpart to U.S. Pat. No. 10,444,759, 14 pages.
Translated Chinese Office Action dated Mar. 29, 2023 for Chinese patent application No. 201880039554.9, a foreign counterpart of U.S. Pat. No. 10,444,759, 27 pages.

* cited by examiner

800

```
┌─────────────────────────────────────────────┐
│ DETERMINE THAT AN OBJECT IS ASSOCIATED WITH │
│   A FIRST SUBSET OF VOXELS AT A FIRST TIME  │
│                     802                     │
└─────────────────────────────────────────────┘
                      ↓
┌─────────────────────────────────────────────┐
│ DETERMINE THAT THE OBJECT IS ASSOCIATED WITH│
│   A SECOND SUBSET OF VOXELS AT A SECOND TIME│
│                     804                     │
└─────────────────────────────────────────────┘
                      ↓
┌─────────────────────────────────────────────┐
│ DETERMINE THAT POSITIONS OF AT LEAST A      │
│ PORTION OF THE FIRST SUBSET OF VOXELS ARE   │
│ DIFFERENT THAN POSITIONS OF AT LEAST A      │
│ PORTION OF THE SECOND SUBSET OF VOXELS      │
│                     806                     │
└─────────────────────────────────────────────┘
                      ↓
┌─────────────────────────────────────────────┐
│    DETERMINE THAT THE OBJECT IS A DYNAMIC   │
│                    OBJECT                   │
│                     808                     │
└─────────────────────────────────────────────┘
                      ↓
┌─────────────────────────────────────────────┐
│  PROVIDE AN INDICATION OF THE DYNAMIC OBJECT│
│          TO A TRACKER AND/OR PLANNER        │
│                     810                     │
└─────────────────────────────────────────────┘
```

FIG. 8

VOXEL BASED GROUND PLANE ESTIMATION AND OBJECT SEGMENTATION

CROSS REFERENCE TO RELATED APPLICATIONS

This is a continuation application which claims priority to commonly assigned, co-pending U.S. patent application Ser. No. 15/622,905, filed Jun. 14, 2017. Application Ser. No. 15/622,905 is fully incorporated herein by reference.

BACKGROUND

Image segmentation is one type of image analysis that is often used for partitioning an image into different segments to provide a more meaningful representation of the image. As one example, an image may be segmented so as to uniquely identify objects within the image. As opposed to image segmentation, segmentation of three-dimensional data can present particular challenges that make segmentation difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 depicts an example process for determining that an object is a dynamic object based on representations of voxel data over time.

DETAILED DESCRIPTION

Figure 1:
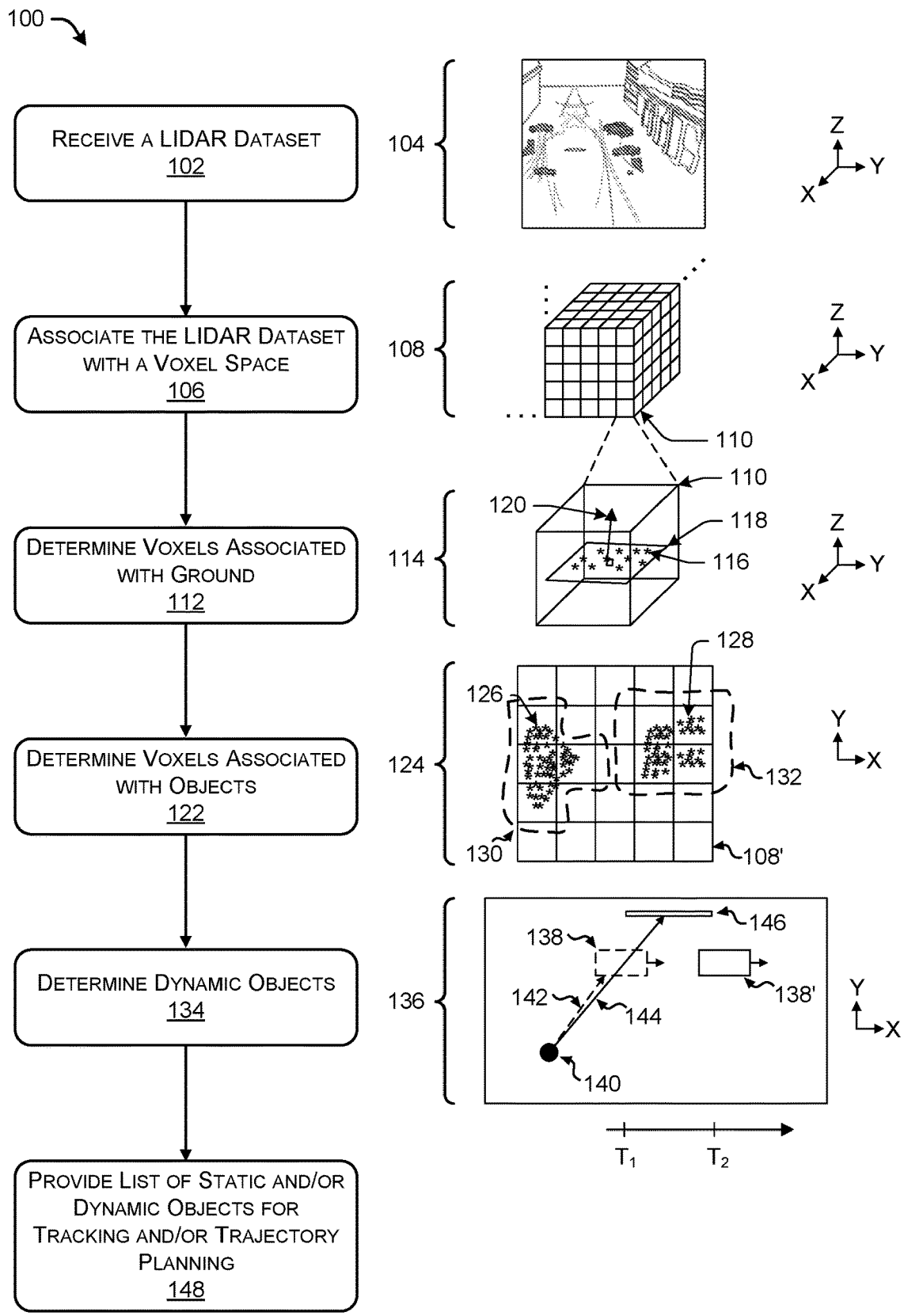
FIG. 1 illustrates a pictorial flow diagram of an example process for static and/or dynamic object segmentation.

This disclosure describes methods, apparatuses, and systems for performing segmentation on three-dimensional data represented in a voxel space to determine a ground plane, static objects, and dynamic objects in an environment. For example, a three-dimensional dataset may include data captured by a LIDAR system for use in conjunction with a perception system for an autonomous vehicle. A LIDAR system may have a light emitter and a light sensor, with the light emitter including one or more lasers that direct highly focused light toward an object or surface which reflects the light back to the light sensor. Measurements of the LIDAR system may be represented as three-dimensional LIDAR data having coordinates (e.g., Cartesian, polar, etc.) corresponding to positions and/or distances captured by the LIDAR system. Data captured by the LIDAR system may be represented in a voxel space, which may include representing the data in a grid of volume elements ("voxels") in three-dimensional space.

In some instances, LIDAR data may be represented in a voxel space as raw sensor data (e.g., with individual <x, y, z, range, time, etc.> values associated with data points) or may be represented as a statistical accumulation of data. For example, LIDAR data may be accumulated in the voxel space, with an individual voxel including processed data, such as: a number of data points, an average intensity, average x-value of LIDAR data associated with the individual voxel; average-y value of the LIDAR data associated with the individual voxel; average z-value of the LIDAR data associated with the individual voxel; and a covariance matrix based on the LIDAR data associated with the voxel.

With the LIDAR data represented in the voxel space, processing can include determining voxels that are associated with a ground plane (e.g., a drivable surface for an autonomous vehicle), which may include determining locally flat voxels. In some instances, determining a locally flat voxel can include fitting a surface to the data in a voxel (e.g., either the individual LIDAR data points and/or performing a calculation on the covariance matrix (e.g., an Eigenvalue decomposition or principle component analysis)), determining a normal vector of the surface, and determining if the normal vector is within a threshold direction of a reference direction, which may correspond to an orientation of an autonomous vehicle. In some instances, determining a locally flat voxel can include a marching cubes-type algorithm which includes creating a mesh in the voxel space, determining that the mesh occupies at least a portion of a voxel, determining a surface normal vector of the mesh associated with the voxel, and determining if the surface normal is within a threshold direction of a reference direction. After locally flat voxels are determined, clustering techniques such as region growing can be used to identify ground voxels or a ground plane representing a flat or drivable surface. Further, as there can be gaps in the data resulting in multiple patches or clusters in the voxel space, the processing can include interpolating between various points in voxels in adjacent clusters to determine if an adjacent cluster should be included as the ground plane. After identifying the ground plane, the ground plane can be removed or set aside from the voxel space, and operations can be performed on the remaining data.

Clustering techniques such as region growing can be applied to the remaining voxels to determine objects represented in the voxel space. Individual objects can be identified by grouping adjacent voxels, with each object being associated with a unique object identifier. As a non-limiting example, all LIDAR points associated with a single object may all have the same object identifier, whereas LIDAR points associated with different objects may have different object identifiers. In some instances, an object identifier may be associated with a voxel and/or propagated to the LIDAR data. As LIDAR data is captured or received over time, an occupancy of a voxel can be evaluated to distinguish between static objects and dynamic objects. For example, ray casting can be used to distinguish between objects closely related in space, such as a person walking close to a background object such as a wall, to distinguish between static objects and dynamic objects. Further, ray casting can be used to determine when voxels that were occupied at a first time are unoccupied at a second, subsequent time, and vice versa, which may indicate movement of an object. Ray casting techniques may also be used to clear a map or increase resolution of objects as data is accumulated over time. Objects that are dynamic objects may further be tagged or associated with a dynamic object identifier.

As processing is performed and objects are identified, a list of static and/or dynamic objects may be provided to a tracking system and/or a planning system as a basis for generating a trajectory for an autonomous vehicle. Further, the operations can be extended to calibrating one or more sensors of the autonomous vehicle, for example, to increase an accuracy of a determined location of the vehicle as other sensors drift over time. Further, as LIDAR data is captured and used to generate a local map, the LIDAR data can be used to localize the autonomous vehicle with respect to a global map. Operations can include determining differences between the local map and a global map, and differences can be uploaded to a central server to be incorporated into the global map and/or for distribution to other vehicles.

In some instances, after LIDAR data has been captured and/or after data has been downloaded or otherwise provided to a computing device such as a central server, the segmentation of objects can be used to generate maps, clean up existing maps, and/or can be used for subsequent annotating operations. For example, static objects that are identified can be incorporated into a global map to assist in navigating autonomous vehicles. In another example, captured data can be used to clean up a global map by refining objects in the global map by using ray casting to remove dynamic objects from the global map. In another example, for stationary objects (e.g., static objects) but impermanent objects (e.g., a parked car), segmentation information can be used to remove such impermanent objects from the global map to further ensure the global map reflects static objects of an environment. In another example, static and/or dynamic objects can be provided to a manual or automatic annotation service, which may perform classification on the objects, to generate training data sets for machine learning, for example. These and other operations and applications of the voxel segmentation techniques are discussed herein.

The segmentation techniques described herein can improve a functioning of a computing device by providing a framework for efficiently segmenting data for object tracking and/or navigation of an autonomous vehicle. In some instances, complex multi-dimensional data, such as LIDAR data, can be represented in a voxel space, which can partition the data, allowing for efficient evaluation and processing of the data. In some instances, the voxel space can represent a sparse voxel space, which reduces an amount of data for processing. In some instances, the techniques provide robust processes to quickly segment a ground plane for trajectory generation, for example. Information associated with the ground plane can be omitted or set aside, and object identification can be performed on a reduced dataset, reducing an amount of memory and processing required for operations. Static and dynamic objects can be identified using robust clustering techniques, which further simplifies processing by focusing tracking operations on dynamic objects, for example. Further, operations described herein can be utilized in an online and offline context, providing a flexible framework to utilize the segmentation data in a variety of contexts. In some instances, faster and/or more accurate segmentation may be utilized in generating a trajectory of an autonomous vehicle, which may improve safety for occupants of the autonomous vehicle. In some instances, the operations described herein may reduce memory requirements or reduce an amount of processing by operating on voxelized data to efficiently simplify the data. These and other improvements to the functioning of the computer are discussed herein.

The methods, apparatuses, and systems described herein can be implemented in a number of ways. Example implementations are provided below with reference to the following figures. Although discussed in the context of LIDAR data and/or in the context of an autonomous vehicle, the methods, apparatuses, and systems described herein can be applied to a variety of systems utilizing machine vision. Further, although described in connection with three-dimensional LIDAR data, the methods, apparatuses, and systems described herein are not limited to three-dimensional data, and are not limited to LIDAR data. In one example, the methods, apparatuses, and systems may be utilized in a two-dimensional context with RADAR data, or used with horizontal LIDAR data. For example, the methods, apparatuses, and systems may be utilized in a manufacturing assembly line context, or in an aerial surveying context. Further, the datasets may include data from stereoscopic cameras, depth cameras, RADAR sensors, acoustic sensors, etc., and may include any number of layers or channels, which may correspond to any number of dimensions. Additionally, the techniques described herein may be used with real data (e.g., captured using sensor(s)), simulated data (e.g., generated by a simulator), or any combination of the two.

FIG. 1 illustrates a pictorial flow diagram of an example process 100 for representing a LIDAR dataset in a voxel space, determining voxels that are associated with a ground, determining static and dynamic objects, and utilizing the static and/or dynamic objects for subsequent processing.

At operation 102, the process can include receiving a LIDAR dataset. Though illustrated in FIG. 1 as a LIDAR dataset, such a dataset may comprise any form of depth data from any one or more sensors as described in detail above. In some instances, the operation 102 may include receiving a plurality of LIDAR datasets from a plurality of LIDAR sensors operating in connection with a perception system of an autonomous vehicle. In some instances, the operation 102 may include combining or fusing data from two or more LIDAR sensors into a single LIDAR dataset (also referred to as a "meta spin"). In some instances, the operation 102 may include extracting a portion of the LIDAR data for processing, such as over a period of time. In some instances, the operation 102 may include receiving RADAR data (or other sensor data) and associating the RADAR data with the LIDAR data to generate a more detailed representation of an environment. An example of a LIDAR dataset is illustrated in an example 104, which may include LIDAR data (e.g., a point cloud) associated with various objects in an urban environment, such as cars, trucks, roads, buildings, bikes, pedestrians, etc.

At operation 106, the process can include associating the LIDAR dataset with a voxel space. Example 108 illustrates a voxel space including five voxels in each dimension (e.g., x, y, z), although any number of voxels may be included in the voxel space. In some instances, the voxel space may correspond to a physical environment, such as an area around an origin or a virtual origin of the LIDAR dataset.

For example, the voxel space may represent an area 100 meters wide, 100 meters long, and 20 meters high. Further, each voxel (e.g., a voxel 110) in the voxel space may represent a physical area, such as 25 centimeters in each dimension. As may be understood in the context of this disclosure, the voxel space may represent any area of an environment, and individual voxels may represent any volume as well. In some instances, voxels may be a uniform size throughout the voxel space, while in some instances, a volume of a voxel may vary based on a location of the voxel relative to an origin of the data. For example, as the density of LIDAR data may decrease as a distance from a LIDAR sensor increases, the size of a voxel in a voxel space may increase in proportion to a distance from the voxel to a LIDAR sensor (or an origin representing a plurality of LIDAR sensors).

In one example, as data is accumulated over time, the operation 106 may include aligning a meta spin (e.g., the LIDAR dataset) with the voxel space. For example, the operation 106 can include determining a transformation to apply to the meta spin to align the meta spin to the voxel space. In particular, the operation 106 may include matching captured LIDAR data with data accumulated in the voxel space by determining the distance of observed points to a plane fitted to the existing accumulation of data. In some examples, this transformation may reduce an error between a position of a vehicle with respect to a location on a global map.

In one example, the voxel space may be initialized as empty space and LIDAR data may be added to the voxel space as it is captured, and another example, the voxel space may be initialized with data representing a global map of previously captured data. In the case of using global map data, the operations may include comparing the locally captured LIDAR data against the global data to localize the autonomous vehicle in the global map space.

In some instances, the operation 106 can include mapping individual points of the point cloud to individual voxels. In some instances, the operation 106 can include subtracting a motion vector associated with the LIDAR data, for example, in an event that the LIDAR data is captured by a moving platform, such as an autonomous vehicle, to convert the LIDAR data to a stationary reference point, for example. That is, in some instances, the LIDAR data may be associated with a voxel space that is fixed with respect to a global map, for example (e.g., in contrast to a voxel space fixed with respect to a moving vehicle). In some instances, the operation 106 can include discarding or omitting voxels that do not include data, or that include a number of points below a threshold number, in order to create a sparse voxel space. Further, in some instances, the operation 106 can include aligning a pose of the vehicle (e.g., an orientation of the vehicle) and associated LIDAR data with the voxel map, for example, to compensate or adjust for any error associated with a position of the vehicle with respect to the voxel space.

Further, in some instances, the operation 106 can include statistically accumulating LIDAR data and processing the data as it is added to individual voxels. For example, individual voxels may include data representing a number of data points, an average intensity, an average x-value of the data, an average y-value of the data, an average z-value of the data, and/or a covariance matrix based on the LIDAR data associated with the individual voxel. Thus, in some instances, data associated with individual voxels may represent processed data, in part, to improve processing performance of the system.

At operation 112, the process can include determining one or more voxels associated with a ground. In some instances, the ground may correspond to a surface that is drivable by an autonomous vehicle. In example 114, a single voxel, for example voxel 110, is shown including LIDAR data 116. As discussed above, in some instances, the LIDAR data 116 may represent a statistical accumulation of data including a number of data points, an average intensity, an average x-value, an average y-value, an average z-value, and a covariance matrix based on the LIDAR data. In such instances, though LIDAR data 116 is depicted in FIG. 1 as a number of points for illustrative purposes, each voxel 110 may only store the statistical accumulation of those points. In some instances, the operation 112 can include fitting a plane 118 to the LIDAR data 116, which may include determining a planar approximation of the LIDAR data 116 (e.g., based at least in part on the covariance matrix, e.g., by performing an Eigenvalue decomposition or principle component analysis on the covariance matrix). For example, the operation 112 may include performing a principal component analysis, or eigenvalue decomposition, on the LIDAR data 116 represented in the voxel 110 to fit the plane 118 to the data 116. In some instances, the operation 112 may include determining a planar approximation of the LIDAR data 116 represented in the voxel 110 at least in part on data associated with neighboring voxels to the voxel 110. The operation 112 can also include determining a normal vector 120 associated with the plane 118. Further, the operation 112 can include determining a reference direction, which may correspond to an orientation of an autonomous vehicle, and may include determining whether the normal vector 120 is within a threshold amount or orientation with respect to the reference direction.

As a non-limiting example, determining a ground plane in the operation 112 may include determining an inner product between a vector in the height dimension (e.g., a reference direction) of an apparatus carrying such a LIDAR system, and the normal vector 120, expressed in a common coordinate system. In such an example, the inner product exceeding a threshold of 15 degrees may indicate that the voxel 110 does not comprise the ground.

Further, the operation 112 may include clustering voxels that are determined to be locally flat voxels to grow a surface corresponding to the ground. Additional details of determining a ground are provided in connection with FIGS. 2, 3, and 4, as well as throughout this disclosure.

At operation 122, the process can include determining voxels associated with objects. In some instances, following the operation 112, the operation 122 can include receiving an indication of the ground, the ground plane, and/or voxels that correspond to a ground, and removing the subset of voxels associated with the ground. Following this removing operation, voxels that remain in the voxel space may represent objects. An example 124 illustrates a top view representation of the voxel space 108', which may correspond to the voxel space illustrated in the example 108. In some instances, the voxel space 108' includes LIDAR data 126 and 128 representing objects in an environment. In some instances, the operation 122 can include clustering to determine that the LIDAR data points 126 are associated with an object 130, and to determine that the LIDAR data points 128 are associated with an object 132. In some instances, the operation 122 may include removing objects that are associated with a number of voxels below a threshold, or otherwise classifying objects based at least in part on a number of voxels associated with the object, a number of LIDAR data points associated with individual voxels, or any combination of the two. In some instances, the operation 122 may determine objects based at least in part on occupied voxels being adjacent to other occupied voxels. As may be understood, by removing the ground from the voxel space 108', the objects 130 and 132 may be isolated without being connected by the ground voxels, leading toward an efficient identification and segmentation of the objects 130 and 132.

At operation 134, the process may include determining dynamic objects in the environment. For example, as LIDAR data is accumulated over time, the operation 134 may include determining motion by determining a voxel that is not occupied at a first time, and determining that the voxel is occupied at a second time. In an example 136, an object 138 can be represented in the voxel space at $T_1$, corresponding to a first time, and the object 138' can be represented in the voxel space at $T_2$, which may correspond to a time different than and subsequent to the first time. Thus, the operation 134 may include tracking an occupancy of voxels over time to determine that the object 138 is moving over time (e.g., as the object 138'), and may correspond to a dynamic object.

Further, the operation 134 may include ray casting operations to determine that voxels that are occupied at a first time, $T_1$, are not occupied at a second time, $T_2$. For example, a LIDAR sensor 140 may capture LIDAR data represented by a vector 142 to identify and segment the object 138. Subsequently, at a second time, $T_2$, the LIDAR sensor 140 may capture LIDAR data represented as a vector 144 to identify and segment an object 146, which may correspond to a wall or building, for example. In some instances, and as discussed in connection with FIG. 5, for example, the operation 134 may include determining voxels that the vector 144 passes through to determine that the voxels between the LIDAR sensor 140 and the object 146 are not occupied. In some instances, these ray casting operations can be used to determine that the object 138 is a dynamic object, for example. Further, the ray casting operations illustrated in the example 136 can be used to clear a map representing the LIDAR data accumulating over time, which may improve an accuracy of object tracking, trajectory planning, etc. By way of another example, the ray casting operations can be used to determine differences between locally captured LIDAR data and global map data representing previously captured LIDAR data.

At operation 148, the process may include providing a list of static and/or dynamic objects for tracking and/or trajectory planning. For example, the process 100 may identify and segment portions of an environment corresponding to a ground, static objects, and/or dynamic objects. In some instances, a list of dynamic objects can be provided to a tracking system to track and/or predict a trajectory of each dynamic object over time. In some instances, a list of static objects and/or an identification of the ground may be provided to a planner system to generate a trajectory for an autonomous vehicle that traverses a drivable surface and avoids or otherwise accounts for the static objects identified herein. These and other operations are possible as part of the identification and segmentation operations described herein.

Figure 2:
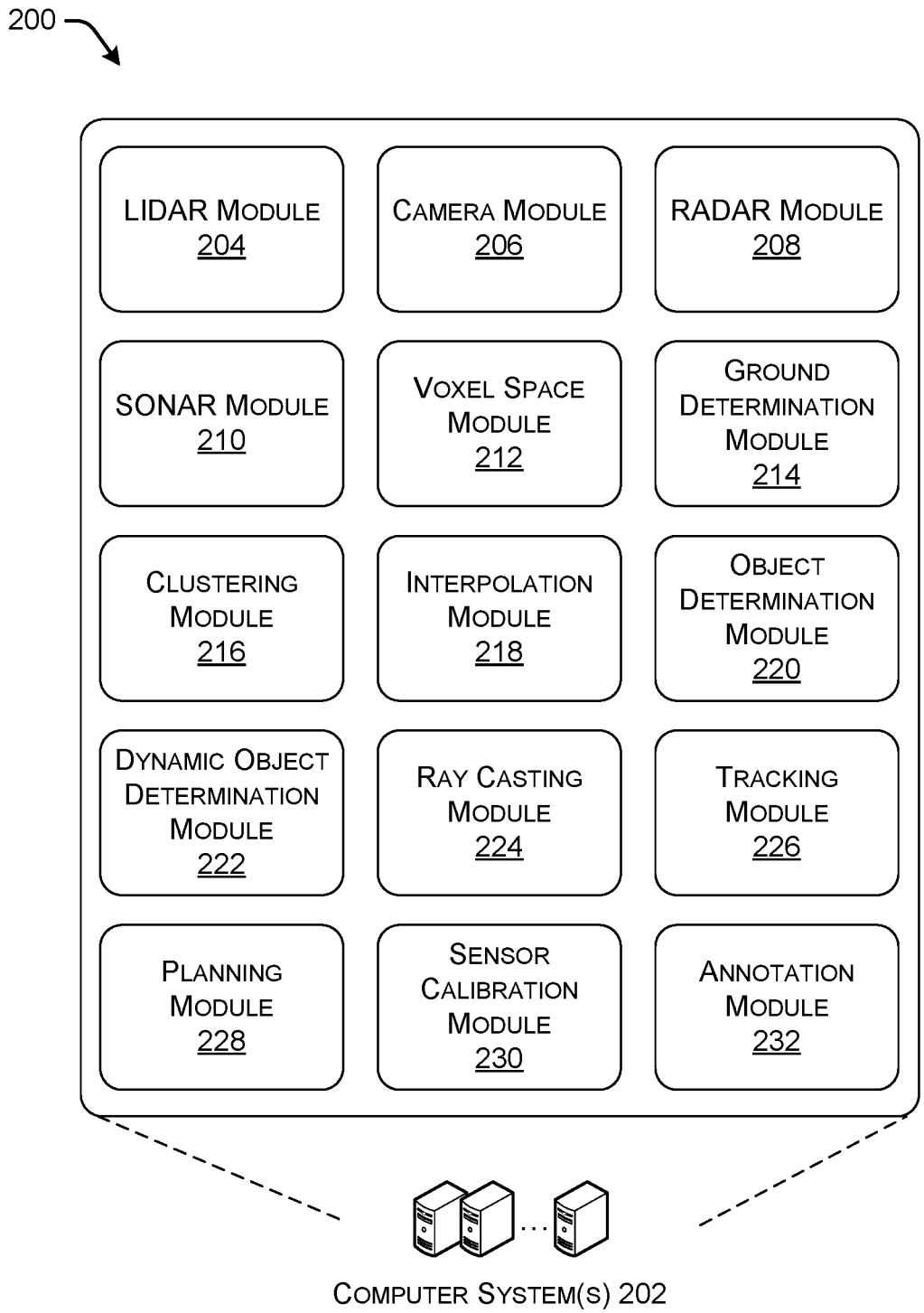
FIG. 2 illustrates an example architecture for implementing object segmentation, as described herein.

FIG. 2 illustrates an example architecture for implementing object identification, as described herein. For example, the architecture 200 may include one or more computer system(s) 202 including various hardware and/or software to implement aspects of the systems, methods, and apparatuses described herein. For example, the computer system(s) 202 may include a LIDAR module 204, a camera module 206, a RADAR module 208, a SONAR module 210, a voxel space module 212, a ground determination module 214, a clustering module 216, an interpolation module 218, an object determination module 220, a dynamic object determination module 222, a ray casting module 224, a tracking module 226, a planning module 228, a sensor calibration module 230, and an annotation module 232.

In some instances, the computer system(s) 202 may be embodied in an autonomous vehicle. In some instances, the computer system(s) 202 may provide perception and planning functionality for the autonomous vehicle. In general, the computer system(s) 202 may include LIDAR perception, RADAR perception, Vision (camera) perception, acoustic perception, segmentation and classification, tracking and fusion, and prediction/planning.

Turning to the LIDAR module 204, the LIDAR module 204 may include one or more LIDAR sensors to capture LIDAR data for segmentation, as described herein. Though illustrated in FIG. 2 as LIDAR data, such a LIDAR module 204 may comprise any one or more depth sensors as described in detail herein. In some instances, the LIDAR module 204 may include functionality to combine or synthesize LIDAR data from a plurality of LIDAR sensors to generate a meta spin of LIDAR data, which may refer to LIDAR data based on multiple LIDAR sensors. In the case of a meta spin of LIDAR data, the LIDAR module 204 may include functionality to determine a virtual origin of the meta spin data (e.g., a coordinate reference frame common to all LIDAR sensors) and perform a data transformation such that LIDAR data from each of the one or more LIDAR sensors is expressed with respect to the virtual origin. As may be understood in the context of this disclosure, the LIDAR module 204 may capture data and may transmit datasets to the computer system(s) 202 for subsequent processing.

The camera module 206 may include one or more camera sensors to capture vision data for image segmentation and/or classification. The camera module 206 may include any number and type of camera sensors. For example, the camera module 206 may include any color cameras, monochrome cameras, depth cameras, RGB-D cameras, stereo cameras, infrared (IR) cameras, ultraviolet (UV) cameras, etc. As may be understood in the context of this disclosure, the camera module 206 may capture data and may transmit datasets to the computer system(s) 202 for subsequent processing. For example, data from the camera module 206 may be included as one or more channels of a multi-channel image.

The RADAR module 208 may include one or more RADAR sensors to capture range, angle, and/or velocity of objects in an environment. As may be understood in the context of this disclosure, the RADAR module 208 may capture data and may transmit datasets to the computer system(s) 202 for subsequent processing. For example, data from the RADAR module 208 may be included as one or more channels of a multi-channel image.

The SONAR module 210 may include one or more speakers or sound emitters and one or more microphones (such as a microphone array) to capture acoustic information of objects in an environment. Additionally, or in the alternative, such a SONAR module 210 may comprise various ultrasonic transducers. For example, the SONAR module 210 may emit pulses of sound and may listen for echoes to determine a position and/or motion information associated with objects in the environment. As may be understood in the context of this disclosure, the SONAR module 210 may capture data and may transmit datasets to the computer system(s) 202 for subsequent processing. For example, data from the SONAR module 210 may be fused with data from the LIDAR module 204, in order to more accurately segment objects and/or to determine information about the objects.

The computing system(s) 202 may include any number or type of other sensors suitable for use in an autonomous vehicle, for example. Various sensors may include, but are not limited to, ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc.

In some instances, the LIDAR module 204, the camera module 206, the RADAR module 208, and/or the SONAR module 210 may provide one or more datasets to the computer system(s) 202 for combining and/or synthesizing the data for improved segmentation.

The computer system(s) 202 may further include simulated data that has been generated by a computer simulation algorithm, for use in part in testing. In some instances, the simulated data may include any type of simulated data, such as camera data, LIDAR data, RADAR data, SONAR data, inertial data, GPS data, etc. In some instances, computer system(s) 202 can modify, transform, and/or perform the converting operations described herein on the simulated data for verifying an operation and/or for training machine learning algorithms, as described herein.

The voxel space module 212 may include functionality to convert or map data to a voxel space. For example, the voxel space module 212 can receive LIDAR data, camera data, RADAR data, SONAR data, etc., and map, convert, or associate individual data points to a voxel representing a three-dimensional space in an environment. In some instances, the voxel space module 212 can define dimensions of a voxel space, including a length, width, and height of the voxel space. Further, the voxel space module 212 may determine a size of individual voxels. In some instances, voxels may be a uniform size and shape throughout the voxel space, while in some instances, a size and/or density of voxels may vary based on a relative location in the voxel space. For example, a size of a voxel may increase or decrease in proportion to a distance of the voxel from an origin or center of the voxel space. Additionally, or in the alternative, such the voxel space module 212 may comprise a transformation between a virtual origin and an origin of the voxel space. In some instances, the voxel space module 212 may include functionality to generate a sparse voxel space, which may include discarding voxels that do not include data, or that include an amount of data below a data threshold. In such an instance, the voxel space may comprise an octomap, voxel hashing, or the like. In some instances, the voxel space module 212 may include functionality to reduce an amount of noise in the data by filtering data as it is mapped to the voxel space. For example, filtering may include removing data below a threshold amount of data per voxel (e.g., a number of LIDAR data points associated with a voxel) or over a predetermined number of voxels (e.g., a number of LIDAR data points associated with a number of proximate voxels). In some instances, the voxel space module 212 can update a voxel space as data is gathered over time, and or in response to an autonomous vehicle navigating within the voxel space. For example, the voxel space module 212 may add data and/or discard data from the voxel space as an autonomous vehicle navigates in an environment.

In some instances, the voxel space module 212 can initialize the voxel space as empty space and can build up representations of objects as LIDAR data is captured over time. In other instances, the voxel space module 212 can initialize the voxel space with global map data so that the locally captured LIDAR data can be used to localize the autonomous vehicle within the global map space, and can be used to clean up or clear voxels of the global map.

The ground determination module 214 may include functionality to parse through individual voxels of the voxel space to determine a ground associated with the environment in the voxel space. For example, the ground determination module 214 may determine a locally flat voxel by estimating a plane representative of the data associated with a particular voxel and determining a normal vector of the plane. For example, the ground determination module 214 may perform a principal component analysis on the voxels to determine a smallest principal component associated with the data associated with the voxel. In some examples, for a principal component analysis, the smallest eigenvector may correspond to the normal vector of the plane, while an eigenvalue associated with the eigenvector may correspond to a spread or level of diffusion of the data associated with the particular voxel in the direction of the smallest eigenvector. By way of another example, and without limitation, such a surface normal determination may be done by calculating the normal of the cross product of vectors indicating directions from a point P in a voxel, to two of P's nearest neighbors. By way of another example and without limitation, such a surface normal determination may be done by performing an eigenvalue decomposition on the covariance matrix associated with an individual voxel. In some instances, the ground determination module 214 may determine whether a target voxel is a locally flat voxel by determining a surface associated with the target voxel based on values associated with neighboring voxels. Further, in some instances, the ground determination module 214 may utilize a marching cubes-type algorithm to create a mesh based on average point values associated with voxels to determine triangles including at least three points to create a surface. Further, the ground determination module 214 may receive a reference orientation, which may correspond to a direction or an orientation of an autonomous vehicle. The ground determination module 214 may determine that a voxel is a locally flat voxel if the normal vector associated with the voxel is within a threshold amount of the reference orientation, as described above.

The clustering module 216 may operate in conjunction with the ground determination module 214 to grow a ground region, starting with a surface that is closest to the origin of the LIDAR data, or starting with a surface that is under an autonomous vehicle. That is, voxels proximate to an autonomous vehicle may be used as a seed voxel for the clustering module 216. The clustering module 216 may determine that locally flat voxels that are adjacent belong to a same cluster, and may grow a region to encompass a ground plane. Further, the clustering module 216 may operate in conjunction with the object determination module 220, discussed below, to determine that voxels are associated with a particular object. The clustering module 216 may utilize a variety of clustering algorithms, including but not limited to: region growing; hierarchical clustering; partitional clustering; square error clustering; graph theoretic clustering; mixture-resolving clustering; mean-seeking clustering; k-means clustering; N-cut clustering; proximity clustering; etc.

The interpolation module 218 may operate in conjunction with the ground determination module 214 and/or the clustering module 216 to combine or associated various clusters together to expand a ground plane. For example, locally flat voxels may not form a single cluster when determining the ground region associated with the autonomous vehicle, in which case, the interpolation module 218 may interpolate between points to determine if a gradient is above or below a threshold gradient for growing the ground plane cluster. Additional aspects of the ground determination module 214, the clustering module 216, and the interpolation module 218 are provided below in connection with FIGS. 3 and 4, as well as throughout the disclosure.

The object determination module 220 may include functionality to determine objects represented in the voxel space. For example, the object determination module 220 may receive an indication of the ground plane from the ground determination module 214 and/or receive an indication of some or all of the locally flat voxels and may remove the voxels associated with a ground from the voxel space. Next, the object determination module 220 may parse through the remaining voxels to determine objects based on connectivity of voxels. For example, the object determination module 220 may operate in conjunction with the clustering module 216 to grow regions in the voxel space corresponding to objects by determining that adjacent voxels are to be considered to be a part of a same object. The object determination module 220 may assign an object identifier to all voxels associated with a particular object, and in some instances, the object identifier assigned or determined by the object determination module 220 may be propagated to LIDAR data associated with voxels comprising the particular object. Additional aspects of the object determination module 220 are provided below in connection with FIG. 3, as well as throughout the disclosure.

The dynamic object determination module 222 may include functionality to distinguish between static object and dynamic objects. For example, the dynamic object determination module 222 may accumulate data over time to determine motion of objects by comparing voxels at a first time to the voxels at a second time to determine if an occupancy of the voxel has changed over time. For example, if a voxel was occupied by an object at a first time is not occupied by the object at a second time, the dynamic object determination module 222 can determine the object is a dynamic object. Based on which voxels are occupied or not occupied over time, the dynamic object determination module 222 can determine a movement of the dynamic object, such as a speed and direction of movement. In some instances, the dynamic object determination module 222 can provide an indication to determine a movement from of the dynamic objects. Additional aspects of the dynamic object determination module 222 are provided below in connection with FIG. 5, as well as throughout the disclosure.

The ray casting module 224 may operate in conjunction with the dynamic object determination module 222 to distinguish between static objects and dynamic objects. Further, the ray casting module 224 may include functionality to clear the voxel space over time as data accumulates in the voxel space. For example, as an object moves throughout the voxel space over time, the voxels occupied by a dynamic object may fill up with data over time. However, the ray casting module 224 may analyze a path of a ray associated with LIDAR data, for example, to determine that voxels through which the ray travels should be cleared. Thus, the ray casting module 224 may provide additional functionality to determine that voxels occupied at a first time are not occupied at a second time, which may be provided to the various modules to determine that objects are dynamic objects, for example. In some instances, the voxel space may be represented in a sparse manner (e.g., representing occupied voxels and disregarding unoccupied voxels) or in a dense manner (e.g., without discarding voxels). In some instances, the ray casting module 224 may store ray casting information in a dense manner, which is to say that voxels that don't exist in a sparse voxel representation (e.g., because voxels do not have associated LIDAR data) can have ray casting information associated with such voxels. For example, voxels without associated LIDAR data can nevertheless be represented in a dense voxel space to include ray casting information associated with the voxels. In some instances, the dense voxel representation may associate positive information with a voxel that a voxel is unoccupied, at least partly in response to the ray casting operations discussed herein. Further, as LIDAR data is accumulated in individual voxels, the negative information may be associated with individual voxels that they are occupied with a static object, for example. As data is accumulated over time, the information can be aggregated, in part, to determine whether a voxel represents open space or a static object, for example. Further, the ray casting module 224 may be used to clean up a global map by comparing the locally captured LIDAR data against global map data. Additional aspects of the ray casting module 224 are provided below in connection with FIG. 5, as well as throughout the disclosure.

The tracking module 226 may include functionality to receive an indication of one or more dynamic objects and perform additional processing in order to track the objects. For example, the tracking module 226 may determine a velocity of a dynamic object and/or may determine and store a trajectory of the dynamic object over time. In some instances, the tracking module 226 may include a prediction algorithm that may predict a path of the object to be tracked based on previous motion of the object.

The planning module 228 may include functionality to receive segmented data and/or indications of the ground plane, static objects, and/or dynamic objects to determine a trajectory of an autonomous vehicle. For example, the planning module 228 may receive segmentation information identifying the ground plane and may generate a trajectory for the autonomous vehicle to follow.

The sensor calibration module 230 may include functionality to calibrate one or more sensors based at least in part on the segmentation information determined with respect to an environment. For example, while sensor data from the LIDAR module 204, camera module 206, RADAR module 208, and/or SONAR module 210 may be used to estimate a location and/or orientation (e.g. using SLAM (simultaneous localization and mapping), an autonomous vehicle may also include additional sensors, such as an inertial measurement unit (IMU) and/or a GPS unit, for determining a location of the autonomous vehicle in an environment. In some instances, the IMU may indicate that the autonomous vehicle is in a first location, while an analysis of the LIDAR data discussed herein indicates that the vehicle is in a second location different from the first location. The sensor calibration module 230 may determine a difference in the locations and may adjust or calibrate one more sensors to update a location of the autonomous vehicle or one or more sensor intrinsic characteristics or extrinsic characteristics.

The annotation module 232 may include functionality to receive segmentation information discussed herein and may annotate the ground plane, static objects, and/or dynamic objects with information associated with the objects. In some instances, the annotation module 232 may provide segmentation information in a graphical user interface for manual verification and/or adjustment by a technician, for example. In some instances, the annotation module 232 may include functionality to determine and apply a classification of the objects discussed herein. The annotation module 232 may include any machine learning algorithms such as neural networks to perform operations of segmentation and classification.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional details of the computer system(s) 202 are provided below in connection with FIG. 11.

Figure 3:
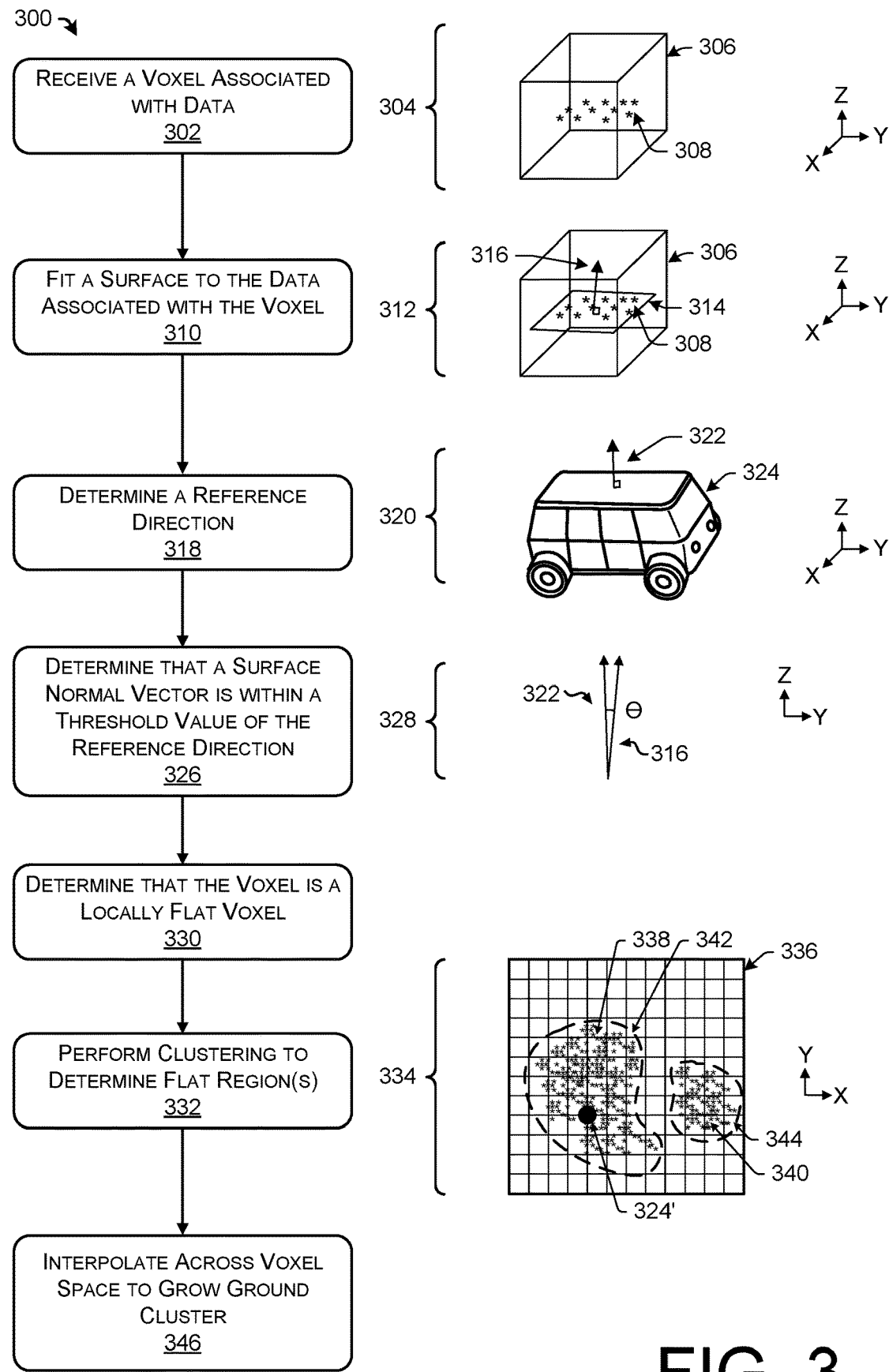
FIG. 3 illustrates a pictorial flow diagram of an example process for segmenting a ground region represented in a voxel space.

FIG. 3 illustrates a pictorial flow diagram of an example process 300 for identifying a ground region represented in a voxel space.

At operation 302, the process can include receiving a voxel associated with data. For example, the operation 302 can include receiving one or more voxels including LIDAR data that has been mapped or converted to a voxel space, as discussed above in connection with FIG. 1. In some instances, the operation 302 can include receiving a voxel space and parsing through each voxel of the voxel space. In some instances, the data associated with the voxel may include LIDAR data, camera data, RADAR data, SONAR data, global map data, and any combination thereof. An example 304 illustrates a voxel 306 including LIDAR data 308), for example.

At operation 310, the process can include fitting a surface to the data associated with the one or more voxels. In an example 312, a surface 314 is fit to the LIDAR data 308 associated with the voxel 306. In some instances, the operation 310 may further include determining a normal vector 316 associated with the surface 314. In some instances, the operation 310 may include performing a principal component analysis of the LIDAR data 308 to determine a smallest principal component, which may correspond to the normal vector 316. In some instances, the operation 310 may not expressly fit the surface 314 to the LIDAR data 308, although conceptually the surface 314 may be determined as part of determining the normal vector 316. In some instances, the operation 310 may include determining a surface associated with a target voxel based on neighboring voxels associated with the target voxel. In some instances, the operation 310 may include determining a mesh associated with the voxel space and determining a surface of the associated with the particular voxel (e.g., the voxel 306).

At operation 318, the process can include determining a reference direction. In an example 320, a reference direction 322 may correspond to an orientation of an autonomous vehicle 324. As a non-limiting example, the reference direction 322 may comprise a unit vector along a height direction of the autonomous vehicle 324. Thus, as the autonomous vehicle 324 travels on a variety of surfaces (flat surfaces, up/down hills, on side slopes, etc.) the reference direction 322 may vary. Additionally, or in the alternative, operation 318 may comprise a coordinate transform from a coordinate system centered at the autonomous vehicle 324 to a coordinate system of the voxel space 306.

At operation 326, the process can include determining that a surface normal vector is within a threshold value of the reference direction. For example, the threshold value may be determined in advance or may vary based on a location of the autonomous vehicle 324, a type of road surface, a velocity of the autonomous vehicle 324, etc. In an example 328, the surface normal vector 316 is compared to the reference direction 322 by taking an inner product between the surface normal vector 316 and the reference direction 322, with the two vectors forming an angle θ. In some instances, the threshold may be set to any angle, such as 15 degrees, such that if θ is greater than 15 degrees, the voxel is determined not to correspond to a locally flat voxel.

At operation 330, if the surface normal vector 316 is within the threshold value of the reference direction, the process can include determining that the voxel is a locally flat voxel. The operation 330 may include associating a tag or identifier with the voxel to indicate that the voxel is a locally flat voxel. In some instances, the tag or identifier can be propagated back to the LIDAR data associated with a particular voxel.

At operation 332, the process can include performing clustering to determine flat regions, which may correspond to a drivable surface for the autonomous vehicle 324. An example 334 illustrates a representative top view of a voxel space 336 (e.g., a single layer of the voxel space 336 in the x-y plane), which may include the voxel 306. In some instances, the voxel space 336 includes a plurality of voxels that have been determined to correspond to locally flat voxels, as discussed herein. Using region growing techniques, the operation 332 may grow clusters to include LIDAR data 338 and 340 associated with locally flat voxels. In some instances, a cluster may be grown by determining locally flat voxels that are adjacent to one another, or that are within a threshold distance to another locally flat voxel, to generate a first cluster 342 and a second cluster 344. In some instances, the operation 332 may determine that a cluster proximate to the autonomous vehicle 324' is to be considered to be a primary ground cluster. That is, a location of the autonomous vehicle 324' may correspond to a seed point when growing the primary ground cluster.

At operation 346, the process can include interpolating across voxel space to grow a ground cluster. In some instances, the ground cluster to be grown in the operation 346 can correspond to the primary ground cluster, which may correspond to the cluster proximate to the autonomous vehicle 324'. Additional details of the operation 346 are provided in connection with FIG. 4.

Figure 4:
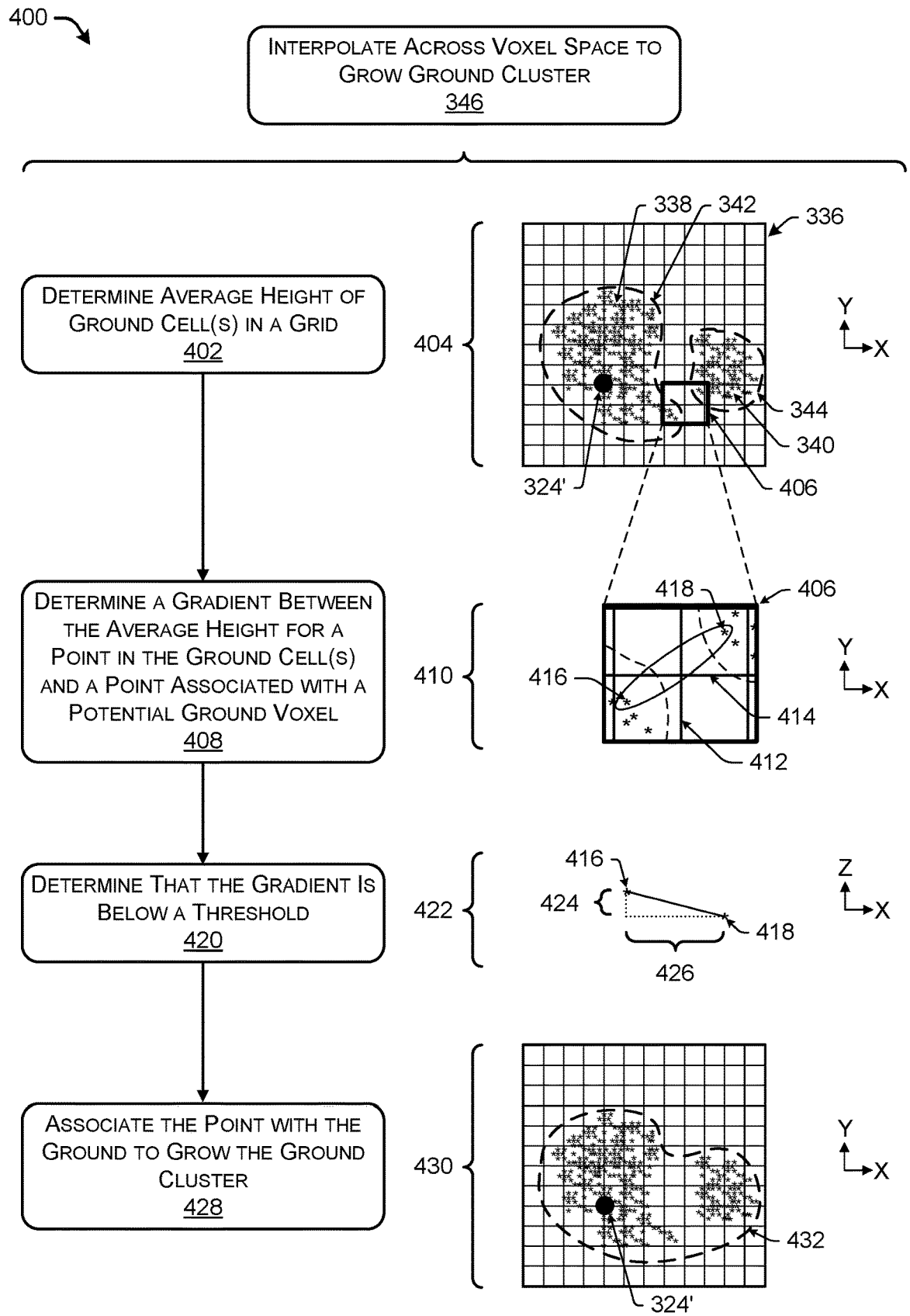
FIG. 4 illustrates a pictorial flow diagram of an example process for interpolating across a voxel space to grow a ground cluster.

FIG. 4 illustrates a pictorial flow diagram of an example process 400 for interpolating across a voxel space to grow a ground cluster.

At operation 402, the process can include determining an average height of ground cells in a grid. In example 404, the voxel space 336 includes the first cluster 342 and the second cluster 344, as discussed above, representing clusters of locally flat voxels. In some instances, the process 400 can be used to determine if the first cluster 342 and the second cluster 344 should be joined to form a single cluster. In some instances, the operation 402 can include determining an average height of points in an individual voxel in the first cluster 342, and in some instances, the operation 402 can include determining an average height of some or all voxels in the cluster 342. In some instances, the operation 402 can include determining a height of the ground cells to distinguish between objects representing an overhang, for example. A detail 406 is included in the example 404, to be discussed below.

At operation 408, the process can include determining a gradient between the average height for a point in the ground cells and a point associated with a potential ground voxel. In an example 410, the detail 406 illustrates a first voxel 412 included in the first cluster 342, and a second voxel 414 in the second cluster 344. As may be understood, the first voxel 412 corresponds to a ground voxel, and the second voxel 414 corresponds to a potential ground voxel. A point 416 associated with the first voxel 412 may be associated with the average <x, y, z> coordinates of the LIDAR data associated with the first voxel 412. In some instances, the point 416 may correspond to the average <x, y, z> coordinates of the LIDAR data associated with the first voxel 412, and the average z-value may be used, at least in part, to compute the average height (e.g., the average z-value) of some or all of the voxels in the cluster 342. In some instances, the point 418 associated with the second voxel 414 (e.g., the potential ground voxel) may be associated with the average <x, y, z> coordinates of the LIDAR data associated with the second voxel 414. Operation 408 includes determining a gradient between a point, or an average of all points, in cluster 342 and a point, or average of points, in cluster 344. In some instances, the operation 408 can include determining an average z-value of the cluster 342 and the cluster 344 to determine if the average z-value of the cluster 344 is within a threshold value to the average z-value of the cluster 342 (e.g., in addition to or instead of determining a gradient, as discussed herein).

At operation 420, the process can include determining whether a component of the gradient is below a threshold. An example 422 illustrates a gradient, or slope, between the points 416 and 418. The view illustrated in the example 422 may correspond to a side view of the top view illustrated in the example 410. In some instances, the slope can be determined as a change in height 424 ($\Delta z$) divided by a horizontal distance 426 between the points 416 and 418.

Thus, in some instances, the slope can be based at least in part on the average <x, y, z> values associated with the first cluster 342 and the average <x, y, z> values associated with the second cluster 344.

At operation 428, the process can include associating the point with the ground to grow the ground cluster. An example 430 illustrates the growth of the ground cluster from the first cluster 342 in the example 404 to the updated ground cluster 432 in the example 430. Accordingly, the process 400 may grow a ground cluster, which increases a size of a region that is drivable by the autonomous vehicle 324'. Further, increasing the size of the ground cluster may increase an amount of data to be disregarded during object segmentation, which improves processing by reducing an amount of voxels to be considered as objects. Further, in some instances, the height of cells in a ground cluster can be used to identify objects of interest to further identify static objects and dynamic objects. That is, for objects proximate to the ground (e.g., located on the ground), a lower bound of the object may correspond to the height of the ground.

Figure 5:
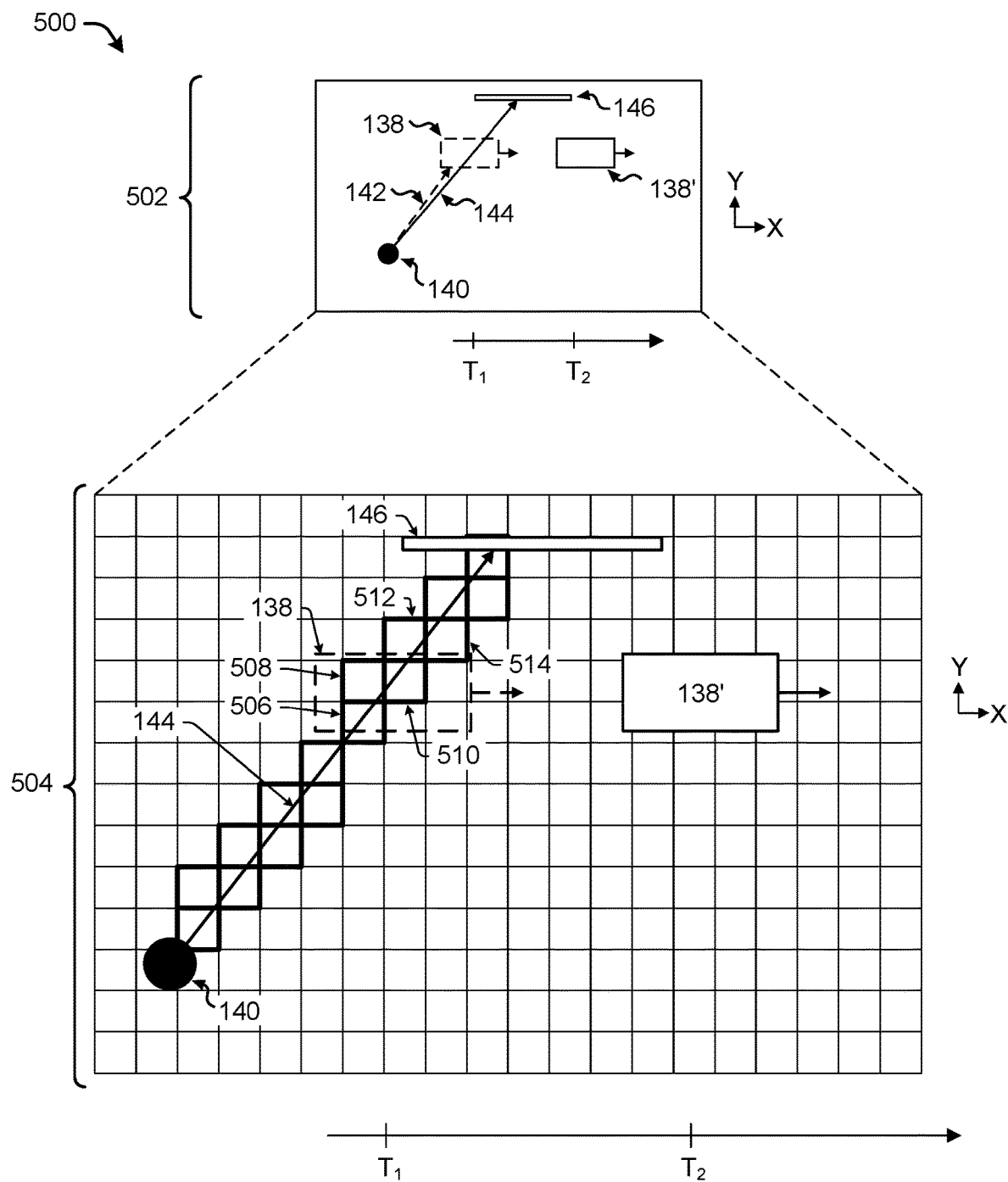
FIG. 5 illustrates an example illustration associated with ray casting and dynamic object segmentation.

FIG. 5 illustrates an example associated with ray casting and dynamic object identification. An example 502 corresponds to the example 136 illustrated in FIG. 1. In some instances, motion can be identified corresponding to the object 138 at time $T_1$ and the object 138' at time $T_2$ by determining voxels that are occupied at a first time and not occupied at a second time, and vice versa. Further, an example 504 illustrates a detail of the ray casting described herein.

In the example 504, the vector 144 is illustrated as originating from the LIDAR sensor 140 and passing through various voxels to capture data associated with the object 146. As may be understood, the vector 144 is associated with the second time $T_2$, whereby the object 138 has moved from the first position at time $T_1$ to the second position at time $T_2$ associated with the object 138'. Accordingly, the vector 144 passes through voxels 506, 508, 510, 512, and 514, which were previously occupied by data representing the object 138 at time $T_1$. Further, the operations described herein may include determining some or all of the voxels through which the vector 144 passes through to determine that previously occupied voxels 506, 508, 510, 512, and 514 are not occupied at the second time $T_2$. Thus, the ray casting illustrated in the example 504 provides an additional technique to determine that the object 138 and 138' is a dynamic object.

Further, the ray casting technique illustrated herein can be used to clear the voxels 506, 508, 510, 512, and 514 at the second time, $T_2$. Thus, the techniques described herein can update a state of the voxel space over time to reduce an amount of data to be maintained at an instant in time, as well as to improve operations to detect and segment dynamic objects in a voxel space.

In another example, the ray casting technique can be used to compare locally captured LIDAR data against previously captured global map data. For example, the object 138 may correspond to an object represented in the global map data. However, if the vector 144 passes through the voxels representing the object 138, when the vector 144 represents locally captured LIDAR data, the operations can determine that there is a difference between the global map and the local map. In some instances, the difference may indicate that the global map is incorrect or that a state of the environment has changed (e.g., the physical world has changed, by removing a tree, for example). In this manner, as differences between the global map and the local LIDAR data are determined, the differences can be uploaded to a central server to be incorporated into the global map data (if the difference is verified by consensus (e.g., by repeated observations of the same or similar event or data) or if a confidence level of the data is above a threshold amount), and distributed to other vehicles.

FIGS. 1, 3, 4, and 6-10 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 6:
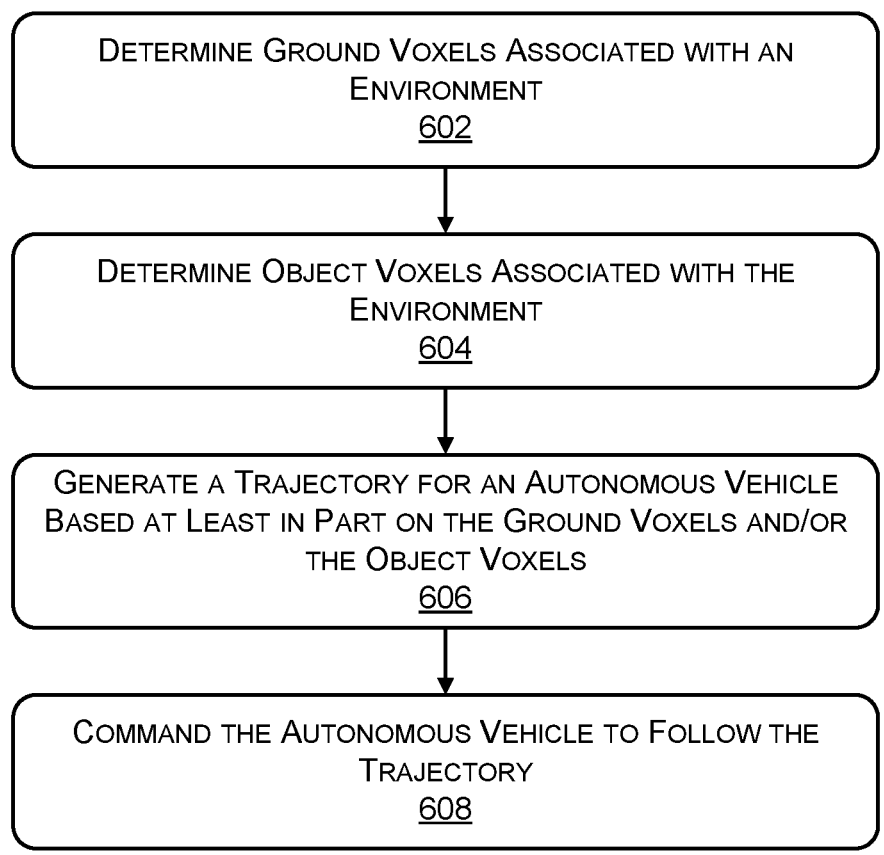
FIG. 6 depicts an example process for generating a trajectory for an autonomous vehicle based on object segmentation, as described herein.

FIG. 6 depicts an example process 600 for generating a trajectory for an autonomous vehicle based on object identification and segmentation, as described herein. For example, some or all of the process 600 can be performed by one or more components in the architecture 200, or in the environment 1100, as described herein.

At operation 602, the process can include determining ground voxels associated with an environment. In some instances, this operation 602 can include determining locally flat voxels, growing a ground cluster, and removing the ground cluster from the voxel space to simplify processing, as discussed herein.

At operation 604, the process can include determining object voxels associated with the environment. In some instances, this operation 604 can include determining static and/or dynamic objects as discussed herein. In some instances, this operation 604 may include segmenting the objects and providing the segmented objects to a classifier, such as a convolutional neural network, to determine an object classification or type.

At operation 606, the process can include generating a trajectory for an autonomous vehicle based at least in part on the ground and/or the objects. For example, the trajectory generated in the operation 606 may be constrained within the ground voxels, which may correspond to a region that is drivable by the autonomous vehicle. Further, the trajectory generated in the operation 606 may avoid the identified objects. In some instances, the operation 606 may include tracking dynamic objects determined in the operation 604, and/or predicting a trajectory of the dynamic objects. Further, the trajectory generated in the operation 606 may be based at least in part on the predicted trajectories of dynamic objects. Such predicted trajectories may, for example, be generated based at least in part on tracking the objects, behavior classification of the objects, and the like.

At operation 608, the process can include generating a sequence of commands to command the autonomous vehicle to drive along the trajectory generated in operation 606. In some instances, the commands generated in the operation 608 can be relayed to a controller onboard an autonomous vehicle to control the autonomous vehicle to drive the trajectory. Although discussed in the context of an autonomous vehicle, the process 600, and the techniques and systems described herein, can be applied to a variety systems utilizing machine vision.

Figure 7:
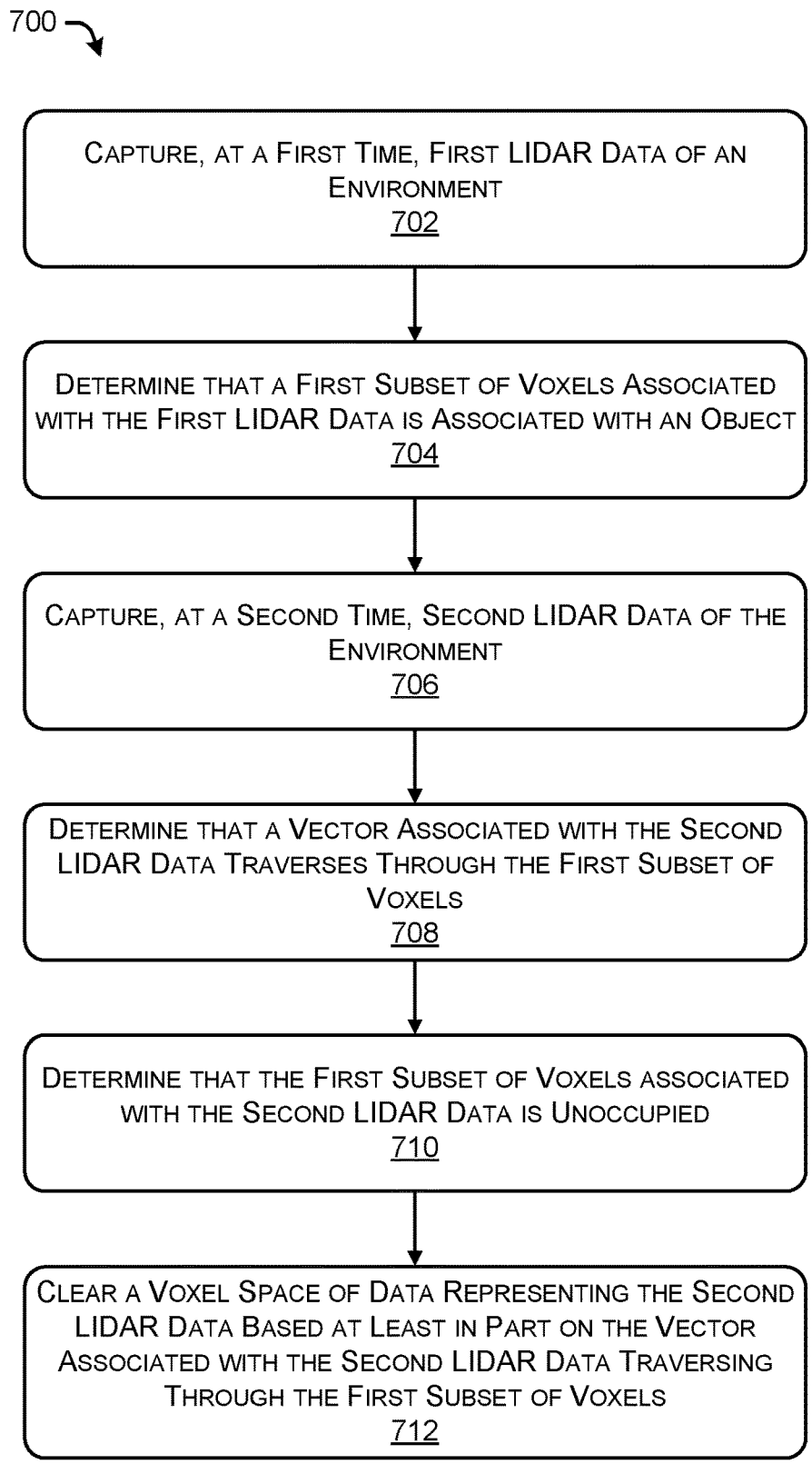
FIG. 7 depicts an example process for clearing a voxel map based on representations of voxel data over time.

FIG. 7 depicts an example process for clearing a voxel map based on representations of voxel data over time. For example, some or all of the process 700 can be performed by one or more components in the architecture 200, or in the environment 1100, as described herein.

At operation 702, the process can include capturing, at a first time, LIDAR data of an environment. As discussed herein, the LIDAR data of an environment may include LIDAR data from one or many LIDAR sensors positioned in an environment. In some instances, this operation 702 may include filtering the LIDAR data to remove noise. Further, the operation 702 may include mapping, converting, assigning, or associating the LIDAR data with a voxel space representing the environment, as discussed herein.

At operation 704, the process can include determining that a first subset of voxels associated with the first LIDAR data is associated with an object. As discussed above this operation may include determining voxels that are associated with a ground, segmenting, removing, and/or setting aside the ground voxels to isolate potential object voxels, and utilizing region growing techniques to determine objects represented in the voxel space. As discussed above, individual objects may be associated with a unique object identifier, which may be associated and/or assigned to individual voxels and/or LIDAR data associated with the individual object.

At operation 706, the process can include capturing, at a second time, second LIDAR data of the environment. In some instances, the operation 706 may include associating the LIDAR data captured at the second time in the same voxel space utilized in the operation 702. In some instances, LIDAR data can include time as a dimension, so as to efficiently filter and/or sort data associated with different times of capture. In some instances, the operation 706 can include determining ground voxels and object voxels, as discussed herein.

At operation 708, the process can include determining that a vector associated with the second LIDAR data traverses through the first subset of voxels. For example, as illustrated in FIG. 5, the operation 708 can include tracing a vector associated with capturing a LIDAR data point through the voxel space to determine voxels through which the vector passes. In some instances, the operation 708 can include determining that the voxels associated with the vector are associated with voxels associated with the object identified in the operation 704.

At operation 710, the process can include determining that the first subset of voxels associated with the second LIDAR data is unoccupied. For example, this operation can include determining an occupancy of the first subset of voxels at the second time based on the vector passing through the first subset of voxels.

At operation 712, the process can include clearing a voxel space of data representing the second LIDAR data based at least in part on the vector associated with the second LIDAR data traversing through the first subset of voxels. That is, the operation 712 can include representing the first subset of voxels at the second time as) unoccupied voxels. In some instances, the information associated with the cleared voxels can be used to determine that the object determined in the operation 704 is a dynamic object.

FIG. 8 depicts an example process for determining that an object is a dynamic object based on representations of voxel data over time. For example, some or all of the process 800 can be performed by one or more components in the architecture 200, or in the environment 1100, as described herein.

At operation 802, the process can include determining that an object is associated with a first subset of voxels at a first time. In some instances, the operation 802 can include identifying one or more objects, as discussed herein. In some instances, the operation 802 can include receiving an object identifier identifying an object and identifying the voxels that are associated with the object identifier. Similarly, at operation 804, the process can include determining that the object is associated with a second subset of voxels at a second time.

At operation 806, the process can include determining that a position of at least a portion of the first subset of voxels is different than a position of at least a portion of the second subset of voxels. That is, as an object moves through space, and accordingly, as the LIDAR data (for example) representing the object is updated throughout the voxel space over time, an occupancy of voxels associated with the object will change over time. For example, voxels that are not occupied by an object at a first time and that are occupied by the object at a second time (or vice versa) may represent motion of the object. This operation 806 can include comparing the positions and/or occupancy of the first subset of voxels with the second subset of voxels to identify the voxels that are not common between the subsets of voxels.

At operation 808, the process can include determining that the object is a dynamic object. For example, by determining the occupancy and/or positions of the voxels associated with the object over time, the operation 808 can determine that the change in voxel occupancy corresponds to motion, for example, and that the object is a dynamic object. That is, in some instances, the differences in the positions and/or locations of voxels in the voxel space between first subset of voxels and the second subset of voxels can correspond to movement of the object. In some instances, the operation 808 include determining that the difference is above a threshold amount, to prevent jitter, noise, or errors in data capture or processing from triggering an identification of the object as a dynamic object. In some instances, the object is determined as a dynamic object based at least in part on the difference determined in the operation 806. In some instances, the operation 808 may further include applying data representing the object to a neural network, for example, to determine a type of an object (e.g., car, building, tree), which may be utilized with in combination with the occupancy information and/or ray casting to determine that the object is a dynamic object.

At operation 810, the process can include providing an indication of the dynamic object to a tracker and/or planner. For example, the object identifier associated with the dynamic object can be provided to a tracker and/or planner for subsequent operations, as discussed herein. For example, the operations can track the occupancy of voxels over time associated with the various objects to determine speed, positions, velocities, etc. of the tracked objects.

Figure 9:
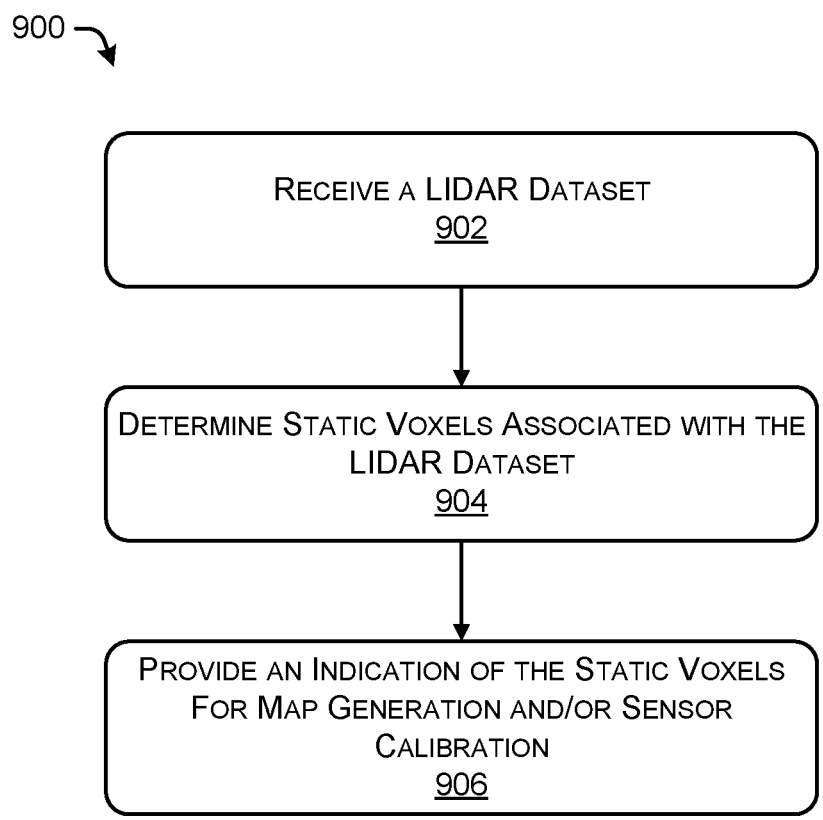
FIG. 9 depicts an example process for performing map generation and/or sensor calibration based on segmentation of objects based on a voxel representation.

FIG. 9 depicts an example process for performing map generation and/or sensor calibration. For example, some or all of the process 900 can be performed by) one or more components in the architecture 200, or in the environment 1100, as described herein.

At operation 902, the process can include receiving a LIDAR dataset. In some instances, the operation 902 may include operations similar to or that are same as the operations 102, 302, and/or 702.

At operation 904, the process can include determining static voxels associated with the LIDAR dataset. In some instances, the operation 904 may include operations similar to or that are same as the operations described in the operation 112, 122, etc., for example. In some instances, a ground surface may be considered a type of static object, for the purposes of the operation 904.

At operation 906, the process can include providing an indication of the static voxels for map generation and/or sensor calibration. For example, the operation 906 can include collecting data over time to identify features of an environment. In the case of map generation, information associated with static objects can be provided to generate a map of the environment. In the case of sensor calibration, the operation 906 can include determining a location from a first sensor, such as a GPS sensor, an inertial measurement unit (IMU), a wheel speed sensor, etc. Further, the operation may include determining a second location of the autonomous vehicle (e.g., that is capturing the LIDAR dataset) by comparing relative positions of static objects to known locations of the static objects to determine a location of the autonomous vehicle on a global map. As a non-limiting example, various sensor data, including LIDAR sensor data, may be used to perform localization using techniques such as SLAM, bundle adjustment, Bayesian filtering, bag of words, or loop-closure algorithms, to name a few. Based on a difference between the first location and the second location, the operation can include calibrating a sensor, or adjusting a position of the location, to provide a more accurate determination of the location of the autonomous vehicle.

Further, the operations discussed herein can be used to localize an autonomous vehicle with respect to a global map. For example, a voxel space can be initialized with LIDAR data corresponding to a global map, which can represent previously captured sensor data. As the autonomous vehicle traverses through space capturing LIDAR data, the operations can localize the autonomous vehicle within the global map, by comparing locally captured features with features present on the global map. Such a process may be similar to those discussed above (e.g., a form of SLAM, Bayesian filtering, bundle adjustments, and the like). In some instances, the operations can determine differences between the local map and a global map. As a non-limiting example, consider an instance where a global map indicates the presence of an object which is absent in the local map, as determined by occupied voxels. In such an instance, a difference may comprise a number of voxels having different states (e.g., occupied or unoccupied states). If an amount of differences is above a first threshold value but below a second threshold value, the differences may be considered to be changes in the environment, such as a parked car that has moved, a removal of a tree, garbage cans out on garbage day, etc., and the differences can be marked uploaded to a central server to be incorporated into the global map. Further, as ray casting operations are performed, more detailed data can be uploaded to the central server and incorporated into the global map. In some instances, if a number of differences is above the second threshold, the operations can determine that the localization has failed, and may disregard the global map data, and operate using only locally captured LIDAR data.

Figure 10:
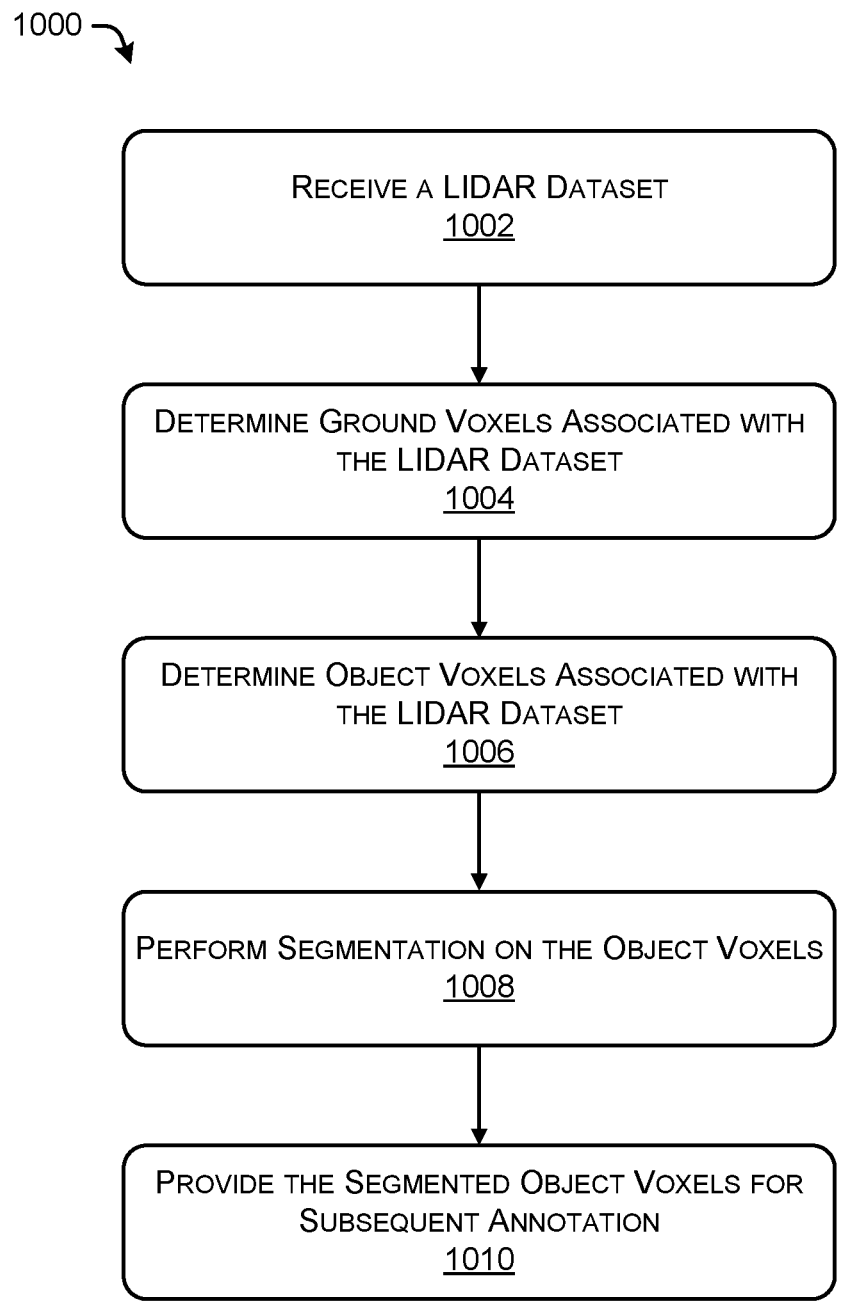
FIG. 10 depicts an example process for annotating objects based on segmentation of objects based on a voxel representation.

FIG. 10 depicts an example process for annotating objects based on identification of objects based on a voxel representation. For example, some or all of the process 1000 can be performed by one or more components in the architecture 200, or in the environment 1100, as described herein.

At operation 1002, the process can include receiving a LIDAR dataset. This operation may include mapping the LIDAR dataset to a voxel space, as discussed herein.

At operation 1004, the process can include determining ground voxels associated with the LIDAR dataset. This operation may include determining ground voxels in accordance with the operations discussed herein.

At operation 1006, the process can include determining object voxels associated with the LIDAR dataset. As discussed herein, the operation 1006 may include determining static and dynamic objects, and associating object identifiers with voxels representing the objects in the voxel space, as discussed herein.

At operation 1008, the process can include performing segmentation on the object voxels. In some instances, the operation 1008 may include generating a three-dimensional bounding box that defines a boundary of each individual object. In some instances, a bounding box can be generated by determining a volume of space in the voxel space associated with voxels associated with an object identifier, for example.

At operation 1010, the process can include providing the segmented object voxels for subsequent annotation. In some instances, the operation 1010 can include providing the segmented object voxels (and an associated three-dimensional bounding box, for example) to a manual annotation service, whereby the segmented objects are presented on a graphical user interface for review. A user may adjust one or more aspects of the segmentation information or the bounding box, for example. In some instances, the segmented object voxels can include a classification type, and the annotation service may confirm or edit the classification type associated with the segmented voxels. In some instances, the operation 1010 may include providing the segmented object voxels to a deep learning network for automatic classification and annotation.

Figure 11:
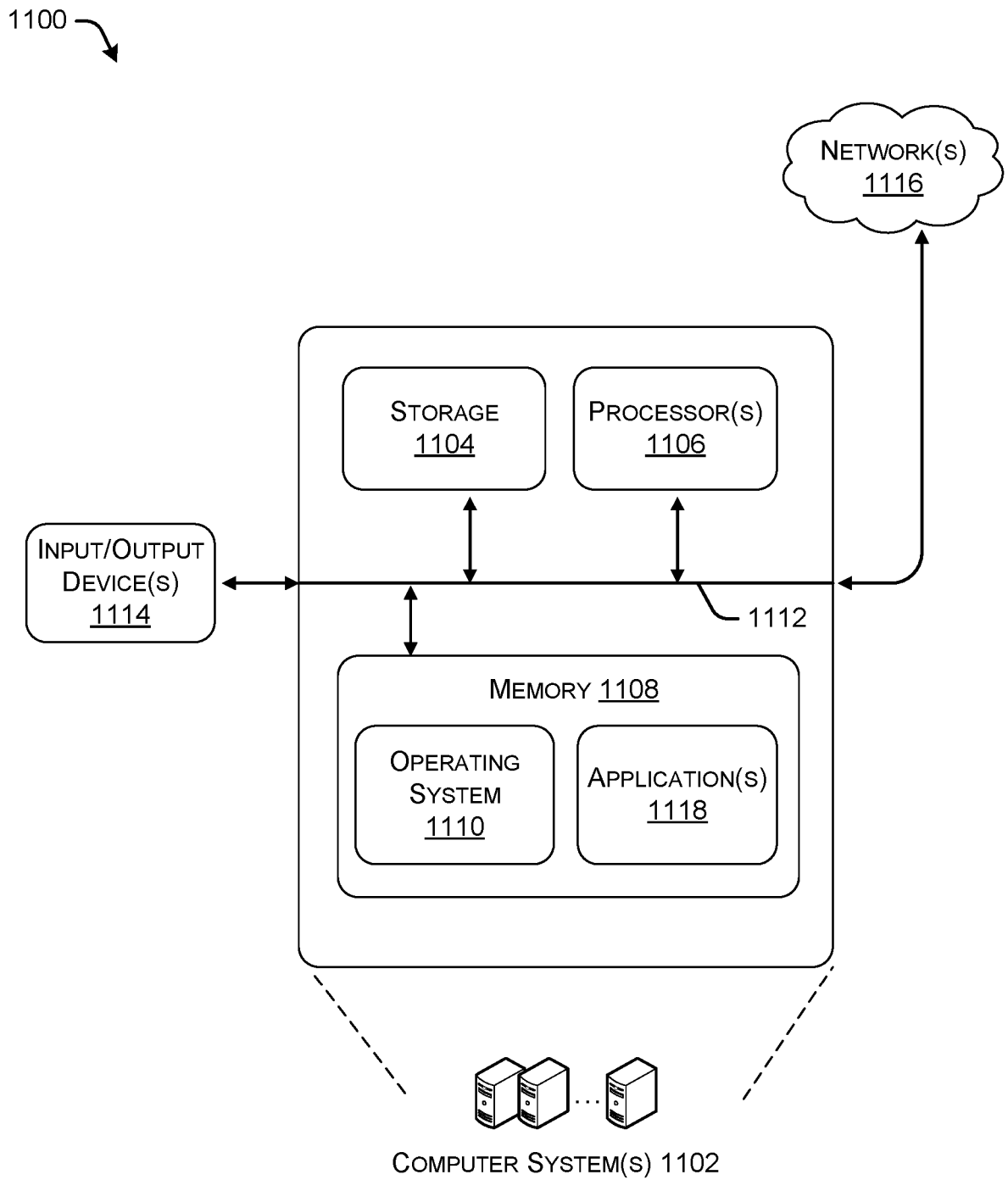
FIG. 11 depicts a block diagram of an example computer system for implementing the techniques described herein.

FIG. 11 illustrates an environment 1100 in which the disclosures may be implemented in whole or in part. The environment 1100 depicts one or more computer systems 1102 that comprise a storage 1104, one or more processor(s) 1106, a memory 1108, and an operating system 1110. The storage 1104, the processor(s) 1106, the memory 1108, and the operating system 1110 may be communicatively coupled over a communication infrastructure 1112. Optionally, the computer system 1102 may interact with a user, or environment, via input/output (I/O) device(s) 1114, as well as one or more other computing devices over a network 1116, via the communication infrastructure 1112. The operating system 1110 may interact with other components to control one or more applications 1118.

In some instances, the computer system(s) 1102 may correspond to the computer system(s) 202 of FIG. 2. Further, the computer system(s) 202 may implement any hardware and/or software to implement the modules 204, 206, 208, 210, 212, 214, 216, 218, 220, 222, 224, 226, 228, and 232 to perform the voxel-based segmentation, as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 11. A processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™ However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™ JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.)

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system comprising: one or more processors; and one or more computer readable storage media communicatively coupled to the one or more processors and storing instructions that are executable by the one or more processors to: receive a LIDAR dataset representing an environment; associate the LIDAR dataset with a voxel space, the voxel space including a plurality of voxels; determine a surface normal vector associated with three-dimensional data associated with an individual voxel of the plurality of voxels; determine a reference direction, the reference direction corresponding to an orientation of an autonomous vehicle; determine that the individual voxel is a locally flat voxel based at least in part on the surface normal vector and the reference direction; determine a ground cluster, the ground cluster representing a drivable surface for the autonomous vehicle, the ground cluster including a plurality of locally flat voxels, the plurality of locally flat voxels including the locally flat voxel; remove the ground cluster from the voxel space to determine a subset of the voxel space; cluster adjacent voxels in the subset of the voxel space to determine at least one object; generate a trajectory for the autonomous vehicle based at least in part on the at least one object; and navigate the autonomous vehicle based at least in part on the trajectory.

B. The system as paragraph A recites, wherein the instructions are further executable by the one or more processors to: determine that an angle formed between the surface normal vector and the reference direction is below a threshold value; and determine that the individual voxel is the locally flat voxel based at least in part on the angle being below the threshold value.

C. The system as paragraph A or B recites, wherein the ground cluster is a first cluster of locally flat voxels, wherein the instructions are further executable by the one or more processors to: determine, as a first height, an average height of LIDAR data represented in the first cluster; select, as a first selected voxel, a first voxel in the first cluster of locally flat voxels; select, as a second selected voxel, a second voxel in a second cluster of locally flat voxels; determine, as a second height, an average height of data represented in the second selected voxel; determine a distance between a first representative point associated with the first selected voxel and a second representative point associated with the second selected voxel; determine a height difference between the first height and the second height; determine a gradient based at least in part on the distance and the height difference; and determine an updated ground cluster including the first cluster of locally flat voxels and at least a portion of the second cluster of locally flat voxels based at least in part on the gradient being below a threshold value.

D. The system as any one of paragraphs A-C recite, wherein the LIDAR dataset is a first LIDAR dataset representing the environment at a first time, and wherein the instructions are further executable by the one or more processors to: receive a second LIDAR dataset representing the environment at a second time; associate the second LIDAR dataset with the voxel space; determine that at least a portion of the first LIDAR dataset represents an object; determine that at least a portion of the second LIDAR dataset represents the object; determine, as a difference, that at least a portion of the second LIDAR dataset associated with the object maps to one or more voxels at the second time that were previously unoccupied by the first object at the first time; and determine, based at least in part on the difference, that the first object is a dynamic object.

E. The system as any one of paragraphs A-D recite, wherein the LIDAR dataset is a first LIDAR dataset received at a first time, and wherein the instructions are further executable by the one or more processors to: determine that the at least one object occupies a first subset of voxels of the voxel space at the first time; receive a second LIDAR dataset at a second time; determine that a vector associated with at least one LIDAR data point of the second LIDAR dataset traverses through at least a portion of the first subset of voxels at the second time; determine that the at least the portion of the first subset of voxels is unoccupied at the second time; and determine that the at least one object is a dynamic object based at least in part on the at least the portion of the first subset of voxels being unoccupied at the second time.

F. The system as any one of paragraphs A-E recite, wherein the instructions are further executable by the one or more processors to associate an object identifier with voxels representing the at least one object.

G. The system as any one of paragraphs A-F recite, wherein the instructions are further executable by the one or more processors to perform an eigenvalue decomposition on a covariance matrix based at least in part on the three-dimensional data associated with the individual voxel to determine the surface normal vector associated with individual voxel.

H. The system as any one of paragraphs A-G recite, wherein the ground cluster includes at least one voxel proximate to the autonomous vehicle as a seed point for growing the ground cluster.

I. A method comprising: receiving a voxel space representing a LIDAR dataset associated with an environment; determining, for a voxel of the voxel space, a surface normal vector associated with three-dimensional data represented by with the voxel; determining, based at least in part on the surface normal vector associated with the voxel, that the voxel is a locally flat voxel; determining a ground cluster, the ground cluster including a plurality of locally flat voxels, the plurality of locally flat voxels including the locally flat voxel; and generating a trajectory for an autonomous vehicle based at least in part on the ground cluster representing a drivable surface for the autonomous vehicle.

J. The method as paragraph I recites, further comprising: determining a reference orientation based at least in part on an orientation of the autonomous vehicle; determining that an angle between the surface normal vector and a vector associated with the reference orientation is within a threshold value; and determining that the voxel is the locally flat voxel based at least in part on the angle being below the threshold value.

K. The method as paragraphs I and J recite, wherein the locally flat voxel is a first locally flat voxel, and wherein determining the ground cluster comprises: selecting, as a seed voxel, the first locally flat voxel, wherein the seed voxel is proximate to the autonomous vehicle; determining that a second locally flat voxel is adjacent to the seed voxel; and associating the seed voxel and the second locally flat voxel with the ground cluster.

L. The method as any one of paragraphs I-K recite, further comprising: extracting voxels associated with the ground cluster from the voxel space to identify a subset of the voxel space; clustering a first group of voxels to determine a first object, individual first voxels of the first group of voxels adjacent to at least one other first voxel of the first group of voxels; and clustering a second group of voxels to determine a second object, individual second voxels of the second group of voxels adjacent to at least one other second voxel of the second group of voxels; wherein the individual first voxels are not adjacent to the individual second voxels.

M. The method as any one of paragraphs I-L recite, further comprising; determining a first cluster of first locally flat voxels; determining a second cluster of second locally flat voxels; determining a height gradient between the first cluster of locally flat voxels and the second cluster of locally flat voxels; determining that the height gradient is below a gradient threshold; and joining, based at least in part on the height gradient being below the gradient threshold, the first cluster with the second cluster to represent the ground cluster.

N. The method as any one of paragraphs I-M recite, further comprising: determining an occupancy of voxels over time to determine at least one dynamic object represented in the voxel space; and generating the trajectory based at least in part on the at least one dynamic object represented in the voxel space.

O. A system comprising: one or more processors; and one or more computer readable storage media communicatively coupled to the one or more processors and storing instructions that are executable by the one or more processors to: capture, using at least one LIDAR sensor, a LIDAR dataset representing an environment; associate the LIDAR dataset with a voxel space, the voxel space including a plurality of voxels; determine, for a voxel of the voxel space, a surface normal vector associated with three-dimensional data represented by the voxel; determine, based at least in part on the surface normal vector associated with the voxel, that the voxel is a locally flat voxel; and determine a ground cluster, the ground cluster including a plurality of locally flat voxels, the plurality of locally flat voxels including the locally flat voxel.

P. The system as paragraph O recites, wherein the instructions are further executable by the one or more processors to: determine a reference orientation; determine that an angle formed between the surface normal vector and a vector associated with the reference orientation is below a threshold value; and determine that the voxel is the locally flat voxel based at least in part on angle being below the threshold value.

Q. The system as paragraphs O or P recites, wherein the instructions are further executable by the one or more processors to: extract voxels associated with the ground cluster from the voxel space to identify a subset of the voxel space; cluster a group of voxels to determine a cluster of voxels, wherein individual voxels of the group of voxels are adjacent to at least one other voxel of the group of voxels; determine that a number of voxels associated with the cluster of voxels is below a threshold number of voxels; and determine that the cluster of voxels is not an object.

R. The system as any one of paragraphs O-Q recite, wherein the instructions are further executable by the one or more processors to: determine a first cluster of first locally flat voxels; determine a second cluster of second locally flat voxels; determine a height gradient between the first cluster of locally flat voxels and the second cluster of locally flat voxels; determine that the height gradient is below a gradient threshold; and join, based at least in part on the height gradient being below the gradient threshold, the first cluster with the second cluster to represent the ground cluster.

S. The system as any one of paragraphs O-R recite, wherein the instructions are further executable by the one or more processors to: determine an occupancy of voxels over time to determine at least one dynamic object represented in the voxel space; and generate the trajectory based at least in part on the at least one dynamic object represented in the voxel space.

T. The system as any one of paragraphs O-S recite, wherein the instructions are further executable by the one or more processors to: generate a trajectory for an autonomous vehicle based at least in part on the ground cluster representing a drivable surface for the autonomous vehicle; and control the autonomous vehicle based at least in part on the trajectory.

What is claimed is:

1. A system comprising:
   one or more processors; and
   one or more non-transitory computer-readable media storing computer- executable instructions that, when executed, cause the system to perform operations comprising:
   receiving a lidar dataset representing an environment;
   associating the lidar dataset with a voxel space, the voxel space comprising a voxel;
   determining, for the voxel of the voxel space, a normal vector associated with data represented by the voxel;
   determining a reference orientation;
   determining that an angle between the normal vector and the reference orientation is below a threshold value;
   determining, based at least in part on the normal vector associated with the voxel and on the angle being below the threshold value, that the voxel is a ground voxel;
   determining a ground cluster comprising a set of ground voxels, the set of ground voxels comprising the ground voxel; and
   controlling a vehicle based at least in part on the ground cluster.

2. The system of claim 1, the operations further comprising:
   extracting a set of voxels associated with the ground cluster from the voxel space to identify a subset of the voxel space;
   clustering the set of voxels to determine a cluster of voxels, wherein a first voxel of the set of voxels is adjacent to at least a second voxel of the set of voxels;
   determining that a number of voxels associated with the cluster of voxels is below a threshold number of voxels; and
   determining that the cluster of voxels is not an object.

3. The system of claim 1, the operations further comprising:
   determining a first cluster of first ground voxels;
   determining a second cluster of second ground voxels;
   determining a gradient between the first cluster and the second cluster;
   determining that the gradient is below a gradient threshold; and determining, as the ground cluster and based at least in part on the gradient being below the gradient threshold, the first cluster and the second cluster.

4. The system of claim 1, wherein the vehicle is an autonomous vehicle, the operations further comprising:
generating, based at least in part on the ground cluster representing a drivable surface for the autonomous vehicle, a trajectory for the autonomous vehicle; and
controlling, based at least in part on the trajectory, the autonomous vehicle.

5. The system of claim 4, the operations further comprising:
determining an occupancy of voxels over a period of time to determine a dynamic object represented in the voxel space;
wherein generating the trajectory is further based at least in part on the dynamic object.

6. A method comprising:
receiving sensor data representing an environment;
associating the sensor data with a voxel space, the voxel space comprising a voxel;
determining, for the voxel of the voxel space, a normal vector associated with data represented by the voxel;
determining, based at least in part on an orientation of a vehicle, a reference orientation;
determining that an angle between the normal vector and the reference orientation is within a threshold value;
determining, based at least in part on the normal vector associated with the voxel and on the angle being below the threshold value, that the voxel is a ground voxel;
determining a ground cluster comprising a set of ground voxels, the set of ground voxels comprising the ground voxel; and
controlling the vehicle based at least in part on the ground cluster.

7. The method of claim 6, wherein the ground voxel is a first ground voxel, and wherein determining the ground cluster comprises:
selecting the first ground voxel as a seed voxel;
determining a second ground voxel adjacent to the seed voxel; and
associating the seed voxel and the second ground voxel with the ground cluster.

8. The method of claim 6, further comprising:
determining a set of voxels associated with the ground cluster from the voxel space to identify a subset of the voxel space;
clustering a first group of voxels of the set of voxels to determine a first object, a first voxel of the first group adjacent to a second voxel of the first group; and
clustering a second group of voxels of the set of voxels to determine a second object, a third voxel of the second group adjacent to a fourth voxel of the second group;
wherein a first individual voxel of the first group is not adjacent to a second individual second voxel of the second group.

9. The method of claim 6, further comprising:
determining a first cluster of first ground voxels;
determining a second cluster of second ground voxels;
determining a gradient between the first cluster and the second cluster;
determining that the gradient is below a gradient threshold; and
joining, based at least in part on the gradient being below the gradient threshold, the first cluster with the second cluster to represent the ground cluster.

10. The method of claim 6, further comprising:
determining an occupancy of voxels over a period of time to determine a dynamic object represented in the voxel space; and
generating, based at least in part on the dynamic object represented in the voxel space, a trajectory for a vehicle.

11. One or more non-transitory computer-readable media storing instructions executable by one or more processors, wherein the instructions, when executed, cause the one or more processors to perform operations comprising:
receiving sensor data representing an environment;
associating the sensor data with a three-dimensional space discretized as a plurality of voxels;
determining, for a voxel of the plurality of voxels, a surface normal associated with a portion of the sensor data associated with the voxel;
determining a reference direction;
determining that an angle between the surface normal and the reference direction is below a threshold value;
determining, based at least in part on the surface normal associated with the voxel and on the angle being below the threshold value, that the voxel is a ground voxel;
determining, as a ground cluster, a set of ground voxels including the ground voxel; and
controlling a vehicle based at least in part on the ground cluster.

12. The one or more non-transitory computer-readable media of claim 11, wherein the ground cluster is a first cluster of ground voxels, the operations further comprising:
determining a first average height of first data represented in the first cluster;
determining a second average height of second data represented in a second cluster of ground voxels;
determining a distance between a first representative point associated with a first voxel of the first cluster and a second representative point associated with a second voxel of the second cluster;
determining a difference between the first average height and the second average height;
determining, based at least in part on the distance and the difference, a gradient; and
determining, based at least in part on the gradient being below a gradient threshold, an updated ground cluster comprising the first cluster and at least a portion of the second cluster.

13. The one or more non-transitory computer-readable media of claim 11, wherein the sensor data is first sensor data representing the environment at a first time, the operations further comprising:
receiving second sensor data representing the environment at a second time;
associating the second sensor data with the three-dimensional space;
determining an object represented in at least a first portion of the first sensor data;
determining the object represented in at least a second portion of the second sensor data;
determining, as a difference, that at least the second portion of the second sensor data maps to one or more voxels at the second time that were previously unoccupied by the object at the first time; and
determining, based at least in part on the difference, that the object is a dynamic object.

14. The one or more non-transitory computer-readable media of claim 11, wherein the sensor data is first sensor data received at a first time, the operations further comprising:

determining an object represented in at least a portion of the sensor data;

determining that the object occupies a first subset of voxels of the plurality of voxels at the first time;

receiving second sensor data at a second time;

determining that a vector associated with an origin and at least one sensor data point of the second sensor data traverses through at least a portion of the first subset of voxels at the second time;

determining that at least the portion of the first subset of voxels is unoccupied at the second time; and determining that the object is a dynamic object based at least in part on the at least the portion of the first subset of voxels being unoccupied at the second time.

15. The one or more non-transitory computer-readable media of claim 11, the operations further comprising:

determining an object represented in at least a portion of the sensor data; and associating an object identifier with voxels representing the object.

16. The one or more non-transitory computer-readable media of claim 11, the operations further comprising:

performing, based at least in part on the sensor data associated with the voxel, an eigenvalue decomposition associated with a covariance matrix to determine the surface normal associated with the voxel.

17. The one or more non-transitory computer-readable media of claim 11, wherein the ground cluster comprises at least one voxel as a seed point for growing the ground cluster.

* * * * *